US011445329B2

(12) United States Patent
Chandrasekaran et al.

(10) Patent No.: US 11,445,329 B2
(45) Date of Patent: Sep. 13, 2022

(54) TECHNIQUES FOR REDUCING UPLINK FEEDBACK LATENCY FOR VIRTUAL REALITY DEVICES IN MULTI-USER DEPLOYMENTS

(71) Applicant: QUALCOMM Incorporated, San Diego, CA (US)

(72) Inventors: Suresh Chandrasekaran, Chennai (IN); Parthiban Ellappan, Virudhunagar (IN); Ravindra Chauhan, Chennai (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/165,486

(22) Filed: Feb. 2, 2021

(65) Prior Publication Data

US 2022/0248177 A1 Aug. 4, 2022

(51) Int. Cl.
*H04W 4/02* (2018.01)
*H04N 5/38* (2006.01)
*H04L 1/18* (2006.01)

(52) U.S. Cl.
CPC .......... *H04W 4/027* (2013.01); *H04L 1/1864* (2013.01); *H04N 5/38* (2013.01)

(58) Field of Classification Search
CPC ........ H04W 4/027; H04L 1/1864; H04N 5/38
USPC ...................................................... 455/456.1
See application file for complete search history.

(56) References Cited

U.S. PATENT DOCUMENTS

| 2018/0091949 | A1* | 3/2018 | Steiner | G01S 13/825 |
| 2019/0068946 | A1* | 2/2019 | Stockhammer | H04N 21/21805 |
| 2019/0166453 | A1* | 5/2019 | Edge | G01S 5/0036 |
| 2020/0008095 | A1  | 1/2020 | Patil et al. | |
| 2020/0128478 | A1* | 4/2020 | Lu | H04W 52/265 |
| 2022/0005337 | A1* | 1/2022 | Shin | H04L 5/0055 |

FOREIGN PATENT DOCUMENTS

| WO | WO-2019103804 A1 | 5/2019 |
| WO | WO-2020207487 A1 | 10/2020 |

OTHER PUBLICATIONS

International Search Report and Written Opinion—PCT/US2021/064610—ISA/EPO—dated Apr. 11, 2022.

* cited by examiner

*Primary Examiner* — Hirdepal Singh
(74) *Attorney, Agent, or Firm* — Holland & Hart LLP

(57) ABSTRACT

Methods, systems, and devices for wireless communications are described. In some systems, a wireless station (STA), which may be an example of a virtual reality (VR) device, may receive downlink data or video frames from an access point (AP) for a display at the wireless STA. In some aspects, the wireless STA may detect a motion change of the wireless STA based on employing a motion change detection mechanism and, if the wireless STA detects a motion change, may transmit an indication of the motion change detection to the AP via a feedback message, such as a block acknowledgement (BA) feedback message. The wireless STA, based on detecting the motion change, may additionally transmit a set of inertial measurements of the wireless STA to the AP. The wireless STA may transmit the inertial measurements to the AP via the feedback message or a separate uplink message.

30 Claims, 17 Drawing Sheets

TECHNIQUES FOR REDUCING UPLINK FEEDBACK LATENCY FOR VIRTUAL REALITY DEVICES IN MULTI-USER DEPLOYMENTS

TECHNICAL FIELD

The following relates to wireless communications, including techniques for reducing uplink feedback latency for virtual reality (VR) devices in multi-user (MU) deployments.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, an STA may communicate with an associated AP via downlink and uplink. The downlink (or forward link) may refer to the communication link from the AP to the STA, and the uplink (or reverse link) may refer to the communication link from the STA to the AP.

In some deployments and for some applications, such as in MU deployments in which the AP may communicate with multiple STAs, both the downlink and the uplink may carry latency sensitive data. Further, as a quantity of the multiple STAs with which the AP may communicate increases, communication between the AP and the multiple STAs may experience frequent and potentially severe truncation, which may increase a likelihood that the AP or the STAs, or both, are unable to satisfy a latency condition for the downlink or uplink communication.

SUMMARY

The described techniques relate to improved methods, systems, devices, or apparatuses that support techniques for reducing uplink feedback latency for virtual reality (VR) devices in multi-user (MU) deployment scenarios. Generally, the described techniques support a procedure for efficiently providing uplink motion feedback from a wireless station (STA) to an access point (AP) based on an actual motion change of the wireless STA. In some implementations, for example, the wireless STA (which may be an example of or otherwise function as a VR device, such as a VR headset) may employ a motion change detection mechanism according to which the wireless STA may detect whether or not the wireless STA experiences a motion change and, in examples in which the wireless STA detects a motion change, the wireless STA may transmit an indication of the motion change detection to the AP. In some aspects, the wireless STA may transmit the indication of the motion change detection via a bit in a block acknowledgement (BA) feedback message in response to downlink data (such as video frames) received from the AP.

In connection with or as part of transmitting the indication of the motion change detection to the AP, the wireless STA may transmit uplink motion information, such as a set of inertial measurements, to the AP. In some examples, the wireless STA may transmit the uplink motion information in the BA feedback message including the indication of the motion change detection. In other words, the wireless STA may piggyback the uplink motion information on the BA feedback message if motion change is detected. In some other examples, the wireless STA may transmit the uplink motion information in an uplink message separate from (and following) the BA feedback message. In such examples, the indication of the motion change detection in the BA feedback message may inform the AP that the uplink message including the uplink motion information is forthcoming from the wireless STA and, as such, the AP may refrain from contending for channel access prior to receiving the uplink message from the wireless STA.

A method for wireless communication at a wireless STA is described. The method may include receiving, from an AP, a first set of multiple frames for an application of the wireless STA, detecting a motion change of the wireless STA, transmitting, to the AP a feedback message responsive to the first set of multiple frames and indicating that the motion change is detected and a set of inertial measurements associated with the wireless STA based on detecting the motion change of the wireless STA, and receiving, from the AP, a second set of multiple frames for the application of the wireless STA based on the feedback message indicating that the motion change is detected and the set of inertial measurements associated with the wireless STA.

An apparatus for wireless communication at a wireless STA is described. The apparatus may include a processor, memory in electronic communication with the processor, and instructions stored in the memory. The instructions may be executable by the processor to cause the apparatus to receive, from an AP, a first set of multiple frames for an application of the wireless STA, detect a motion change of the wireless STA, transmit, to the AP a feedback message responsive to the first set of multiple frames and indicating that the motion change is detected and a set of inertial measurements associated with the wireless STA based on detecting the motion change of the wireless STA, and receive, from the AP, a second set of multiple frames for the application of the wireless STA based on the feedback message indicating that the motion change is detected and the set of inertial measurements associated with the wireless STA.

Another apparatus for wireless communication at a wireless STA is described. The apparatus may include means for receiving, from an AP, a first set of multiple frames for an application of the wireless STA, means for detecting a motion change of the wireless STA, means for transmitting, to the AP a feedback message responsive to the first set of multiple frames and indicating that the motion change is detected and a set of inertial measurements associated with the wireless STA based on detecting the motion change of the wireless STA, and means for receiving, from the AP, a second set of multiple frames for the application of the wireless STA based on the feedback message indicating that the motion change is detected and the set of inertial measurements associated with the wireless STA.

A non-transitory computer-readable medium storing code for wireless communication at a wireless STA is described. The code may include instructions executable by a processor to receive, from an AP, a first set of multiple frames for an application of the wireless STA, detect a motion change of the wireless STA, transmit, to the AP a feedback message responsive to the first set of multiple frames and indicating that the motion change is detected and a set of inertial measurements associated with the wireless STA based on detecting the motion change of the wireless STA, and receive, from the AP, a second set of multiple frames for the application of the wireless STA based on the feedback message indicating that the motion change is detected and the set of inertial measurements associated with the wireless STA.

In some examples of the method, apparatuses, and non-transitory computer-readable medium described herein, detecting the motion change of the wireless STA may include operations, features, means, or instructions for comparing a first set of inertial measurements from a first time period with the set of inertial measurements from a second time period to obtain a difference in inertial measurements between the first time period and the second time period and determining that the difference in inertial measurements satisfies a motion change detection threshold.

In some examples of the method, apparatuses, and non-transitory computer-readable medium described herein, transmitting the set of inertial measurements associated with the wireless STA may include operations, features, means, or instructions for transmitting an indication of the set of inertial measurements associated with the wireless STA within a BA information field of the feedback message.

In some examples of the method, apparatuses, and non-transitory computer-readable medium described herein, transmitting the feedback message indicating that the motion change may be detected may include operations, features, means, or instructions for transmitting an indication that the BA information field includes the set of inertial measurements associated with the wireless STA via a bit within a BA control field of the feedback message.

In some examples of the method, apparatuses, and non-transitory computer-readable medium described herein, transmitting the feedback message indicating that the motion change may be detected may include operations, features, means, or instructions for transmitting an indication that the motion change may be detected via a bit in the feedback message during a first time period.

In some examples of the method, apparatuses, and non-transitory computer-readable medium described herein, transmitting the set of inertial measurements associated with the wireless STA may include operations, features, means, or instructions for transmitting an uplink message including the set of inertial measurements associated with the wireless STA during a second time period based on transmitting the indication that the motion change may be detected via the bit in the feedback message during the first time period.

In some examples of the method, apparatuses, and non-transitory computer-readable medium described herein, there may be an absence of downlink data between the first time period and the second time period based at least in part transmitting the indication that the motion change may be detected during the first time period.

In some examples of the method, apparatuses, and non-transitory computer-readable medium described herein, receiving the first set of multiple frames for the application of the wireless STA may include operations, features, means, or instructions for receiving a set of multiple video frames for a VR application of the wireless STA.

A method for wireless communication at an AP is described. The method may include transmitting, to a wireless STA, a first set of multiple frames for an application of the wireless STA, receiving, from the wireless STA a feedback message responsive to the first set of multiple frames and indicating that a motion change of the wireless STA is detected and a set of inertial measurements associated with the wireless STA based on the indicating that the motion change of the wireless STA is detected, and transmitting, to the wireless STA, a second set of multiple frames for the application of the wireless STA based on the feedback message indicating that the motion change is detected.

An apparatus for wireless communication at an AP is described. The apparatus may include a processor, memory in electronic communication with the processor, and instructions stored in the memory. The instructions may be executable by the processor to cause the apparatus to transmit, to a wireless STA, a first set of multiple frames for an application of the wireless STA, receive, from the wireless STA a feedback message responsive to the first set of multiple frames and indicating that a motion change of the wireless STA is detected and a set of inertial measurements associated with the wireless STA based on the indicating that the motion change of the wireless STA is detected, and transmit, to the wireless STA, a second set of multiple frames for the application of the wireless STA based on the feedback message indicating that the motion change is detected.

Another apparatus for wireless communication at an AP is described. The apparatus may include means for transmitting, to a wireless STA, a first set of multiple frames for an application of the wireless STA, means for receiving, from the wireless STA a feedback message responsive to the first set of multiple frames and indicating that a motion change of the wireless STA is detected and a set of inertial measurements associated with the wireless STA based on the indicating that the motion change of the wireless STA is detected, and means for transmitting, to the wireless STA, a second set of multiple frames for the application of the wireless STA based on the feedback message indicating that the motion change is detected.

A non-transitory computer-readable medium storing code for wireless communication at an AP is described. The code may include instructions executable by a processor to transmit, to a wireless STA, a first set of multiple frames for an application of the wireless STA, receive, from the wireless STA a feedback message responsive to the first set of multiple frames and indicating that a motion change of the wireless STA is detected and a set of inertial measurements associated with the wireless STA based on the indicating that the motion change of the wireless STA is detected, and transmit, to the wireless STA, a second set of multiple frames for the application of the wireless STA based on the feedback message indicating that the motion change is detected.

In some examples of the method, apparatuses, and non-transitory computer-readable medium described herein, receiving the set of inertial measurements associated with the wireless STA may include operations, features, means, or instructions for receiving an indication of the set of inertial measurements associated with the wireless STA within a BA information field of the feedback message.

In some examples of the method, apparatuses, and non-transitory computer-readable medium described herein, receiving the feedback message indicating that the motion change may be detected may include operations, features, means, or instructions for receiving an indication that the BA information field includes the set of inertial measurements associated with the wireless STA via a bit within a BA control field of the feedback message.

In some examples of the method, apparatuses, and non-transitory computer-readable medium described herein, receiving the feedback message indicating that the motion change may be detected may include operations, features, means, or instructions for receiving an indication that the motion change may be detected via a bit in the feedback message during a first time period.

In some examples of the method, apparatuses, and non-transitory computer-readable medium described herein, receiving the set of inertial measurements associated with the wireless STA may include operations, features, means, or instructions for receiving, from the wireless STA, an uplink message including the set of inertial measurements associated with the wireless STA during a second time period based on receiving the indication that the motion change may be detected via the bit in the feedback message during the first time period.

Some examples of the method, apparatuses, and non-transitory computer-readable medium described herein may further include operations, features, means, or instructions for refraining from transmitting downlink data between the first time period and the second time period based on receiving the indication that the motion change may be detected during the first time period and receiving the uplink message including the set of inertial measurements associated with the wireless STA during the second time period.

In some examples of the method, apparatuses, and non-transitory computer-readable medium described herein, transmitting the first set of multiple frames for the application of the wireless STA may include operations, features, means, or instructions for transmitting a set of multiple video frames for a VR application of the wireless STA.

In some examples of the method, apparatuses, and non-transitory computer-readable medium described herein, the AP operates in an MU-VR scenario and the method, apparatuses, and non-transitory computer-readable medium may include further operations, features, means, or instructions for transmitting, to a set of multiple wireless STAs, a first set of multiple video frames for VR applications of the set of multiple wireless STAs, receiving, from one or more wireless STAs of the set of multiple wireless STAs feedback messages responsive to the first set of multiple video frames and indicating that respective motion changes of the one or more wireless STAs may be detected and sets of inertial measurements associated with the one or more wireless STAs based on the indicating that the respective motion changes of the one or more wireless STAs may be detected, and transmitting, to the one or more wireless STAs, a second set of multiple video frames for the VR applications of the one or more wireless STAs based on the feedback messages indicating that the respective motion changes may be detected.

DETAILED DESCRIPTION

Figure 1:
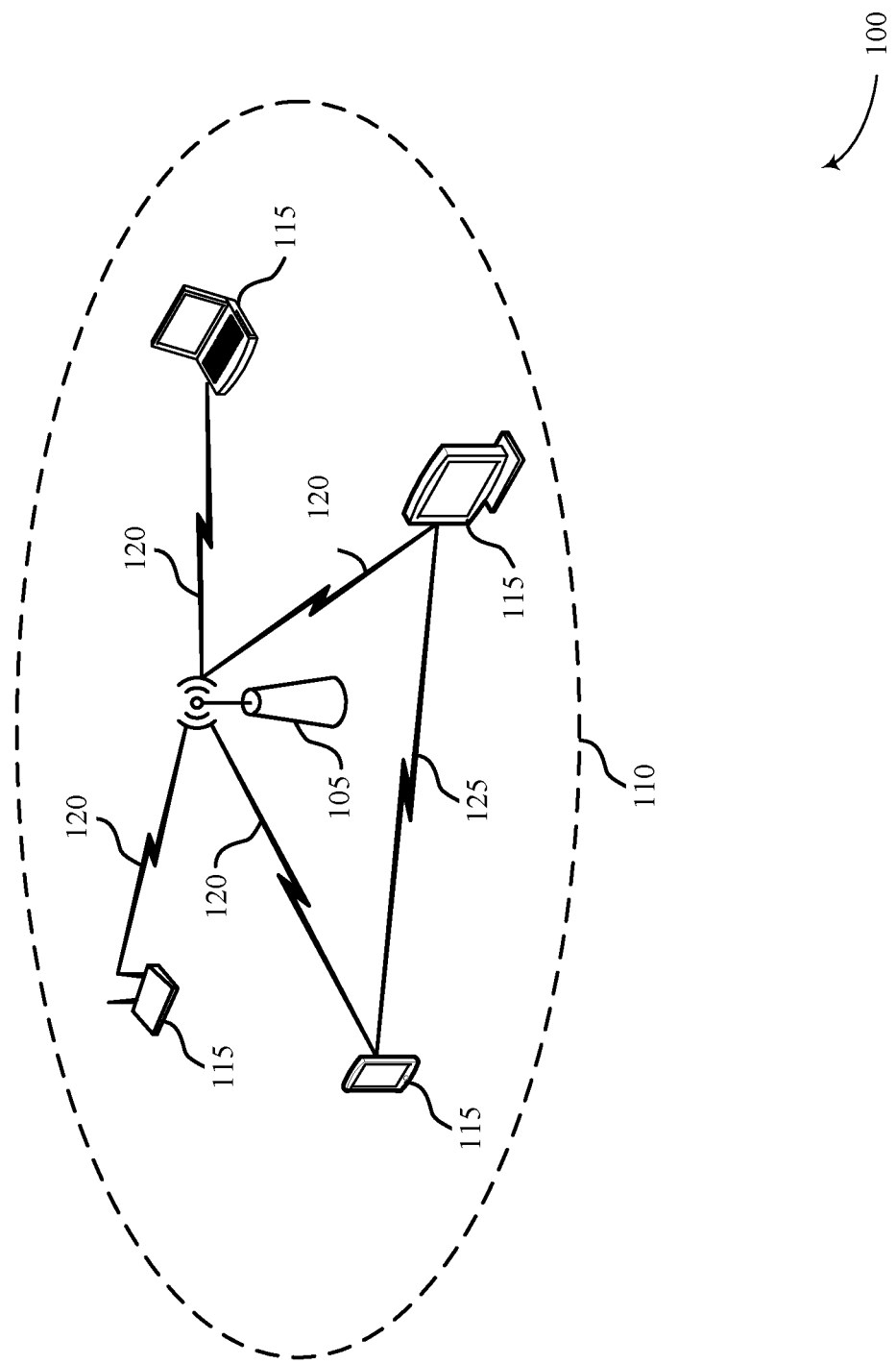
FIGS. 1 and 2 illustrate examples of wireless local area networks (WLANs) that support techniques for reducing uplink feedback latency for virtual reality (VR) devices in multi-user (MU) deployments in accordance with aspects of the present disclosure.

In some wireless communications systems, such as wireless local area networks (WLANs), an access point (AP) may communicate with multiple wireless stations (STAs). In some examples, such as in examples in which the wireless STAs are examples of or otherwise function as virtual reality (VR) devices, the AP may transmit relatively large downlink transmissions including relatively long rendered video frames to one or more of the multiple wireless STAs via a downlink. Such downlink transmissions including rendered video frames for the wireless STAs may be latency critical or relatively latency sensitive. Additionally, the wireless STAs may transmit latency critical or latency sensitive motion data, such as inertial measurement unit (IMU) data, to the AP via an uplink.

Further, in some cases, the multiple wireless STAs and the AP may contend for a channel or medium over which the wireless STAs and the AP may communicate, which may result in delays for channel access for some devices. To avoid such contention for the channel or medium, some systems may employ a fixed polling period according to which the AP may poll the wireless STAs for motion data. Such a fixed polling period, however, may result in too frequent polling (which may cause increased airtime overhead) or too infrequent polling (which in the example of virtual reality or augmented reality applications may cause a high persistence of video frames, such as judder, that may adversely affect a user experience). Further, such a fixed polling period may constrain a system to tight synchronization (which may be difficult to achieve in a WLAN) and may become increasingly inefficient or costly in multi-user (MU) deployments in which the AP communicates with multiple wireless STAs.

In some implementations of the present disclosure, a wireless STA may support the transmission of motion data based on actual motion changes experienced at the wireless STA (as opposed to the transmission of motion data based on a fixed polling period). For example, the wireless STA may employ a motion change detection mechanism according to which the wireless STA may detect whether or not the wireless STA experiences a motion change and, in examples in which the wireless STA detects a motion change, the wireless STA may transmit an indication of the motion change detection to the AP. Additionally, and based on the motion change detection, the wireless STA may transmit motion data, such as a set of inertial measurements, to the AP. As such, the wireless STA may transmit motion data to the AP over the medium if and when the wireless STA detects a motion change.

Particular aspects of the subject matter described in this disclosure can be implemented to realize one or more of the following potential advantages. For example, the described techniques may be implemented to satisfy latency sensitivities associated with communication between the AP and the multiple wireless STAs while maintaining relatively low signaling overhead and improving user experience. For instance, based on supporting the transmission of motion data from the wireless STA to the AP according to the motion change detection mechanism (such that the wireless STA transmits motion data to the AP upon detection of a motion change), the wireless STA and the AP may refrain from attempting to fix a polling period (as such a fixed polling period could result in unnecessary signaling overhead or poor user experience) while satisfying any latency constraints associated with the motion data. As such, the wireless STA may provide the motion data according to a more optimal frequency or interval based on actual motion changes at the wireless STA and, as a result, the AP and the wireless STA may exchange fewer frames. Further, in some examples, the wireless STA may transmit the motion data in a block acknowledgement (BA) feedback message, which may enable the updating of motion information at the AP without an explicit round of packet exchange. Accordingly, the wireless STAs and the AP may experience reduced airtime overhead and fewer collisions during contention for the medium, which my result in greater spectral efficiency, higher data rates, and improved user experience, among other benefits.

Aspects of the disclosure are initially described in the context of a wireless communications system. Additionally, aspects of the disclosure are illustrated by and described with reference to a BA format, communication sequences, and a process flow. Aspects of the disclosure are further illustrated by and described with reference to apparatus diagrams, system diagrams, and flowcharts that relate to techniques for reducing uplink feedback latency for VR devices in MU deployments.

FIG. 1 illustrates a WLAN 100 (also known as a Wi-Fi network) configured to support techniques for reducing uplink feedback latency for VR devices in MU deployments in accordance with aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

In some cases, the STAs 115 may function as VR devices in an MU deployment in which the AP 105 provides downlink data to the multiple STAs 115, the downlink data including video frames to be displayed at the STAs 115. For example, the downlink data may include video frames rendered based on uplink data (including motion information) provided to the AP 105 from the STAs 115. As such, a STA 115 may receive the downlink data and generate a display for an end user based on an application (e.g., a VR application) of the STA 115. In some implementations of the present disclosure, the STA 115 may continuously or periodically measure or detect whether the STA 115 experiences a motion change and, if the STA 115 measures or detects that the STA 115 experiences a motion change, the STA 115 may transmit an indication of the motion change detection to the AP 105. In some examples, the STA 115 may transmit the indication of the motion change detection to the AP 105 in a feedback message, such as a BA feedback message, responsive to the downlink data received from the AP 105. For example, the STA 115 may transmit the feedback message to the AP 105 responsive to the downlink data received from the AP 105 and, in examples in which the STA 115 detects a motion change, the STA 115 may include the indication of the motion change detection in the feedback message.

As such, the AP 105 may receive the feedback message and identify that the STA 115 has experienced a motion change. In some aspects, such an identification by the AP 105 may be associated with a determination by the AP 105 to transmit updated downlink data (e.g., updated video frames) to the STA 115 based on the change in orientation of the STA 115. Further, the indication of the motion change detection in the feedback message may indicate that uplink motion data is forthcoming from the STA 115. For example, based on detecting the motion change at the STA 115, the STA 115 may transmit the indication of the motion change detection in the feedback message and may additionally transmit updated motion data, such as a set of inertial measurements, to the AP 105 to enable the AP 105 to provide updated video frames based on the updated or current orientation of the STA 115.

In some examples, the STA 115 may transmit the updated motion data to the AP 105 in a field, such as a BA information field, of the feedback message (e.g., the feedback message also carrying the indication of the motion change detection). Additional details relating to such an inclusion of the updated motion data of the STA 115 within the feedback message are described herein, including with reference to FIGS. 3 and 4. In some other examples, the STA 115 may transmit the updated motion data in an uplink message different from the feedback message. Additional details relating to such a follow-up uplink message are described herein, including with reference to FIG. 5. The AP 105, based on receiving the updated motion data from the STA 115, may transmit the updated downlink data (e.g., the updated video frames) to the STA 115 based on the change in orientation of the STA 115.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
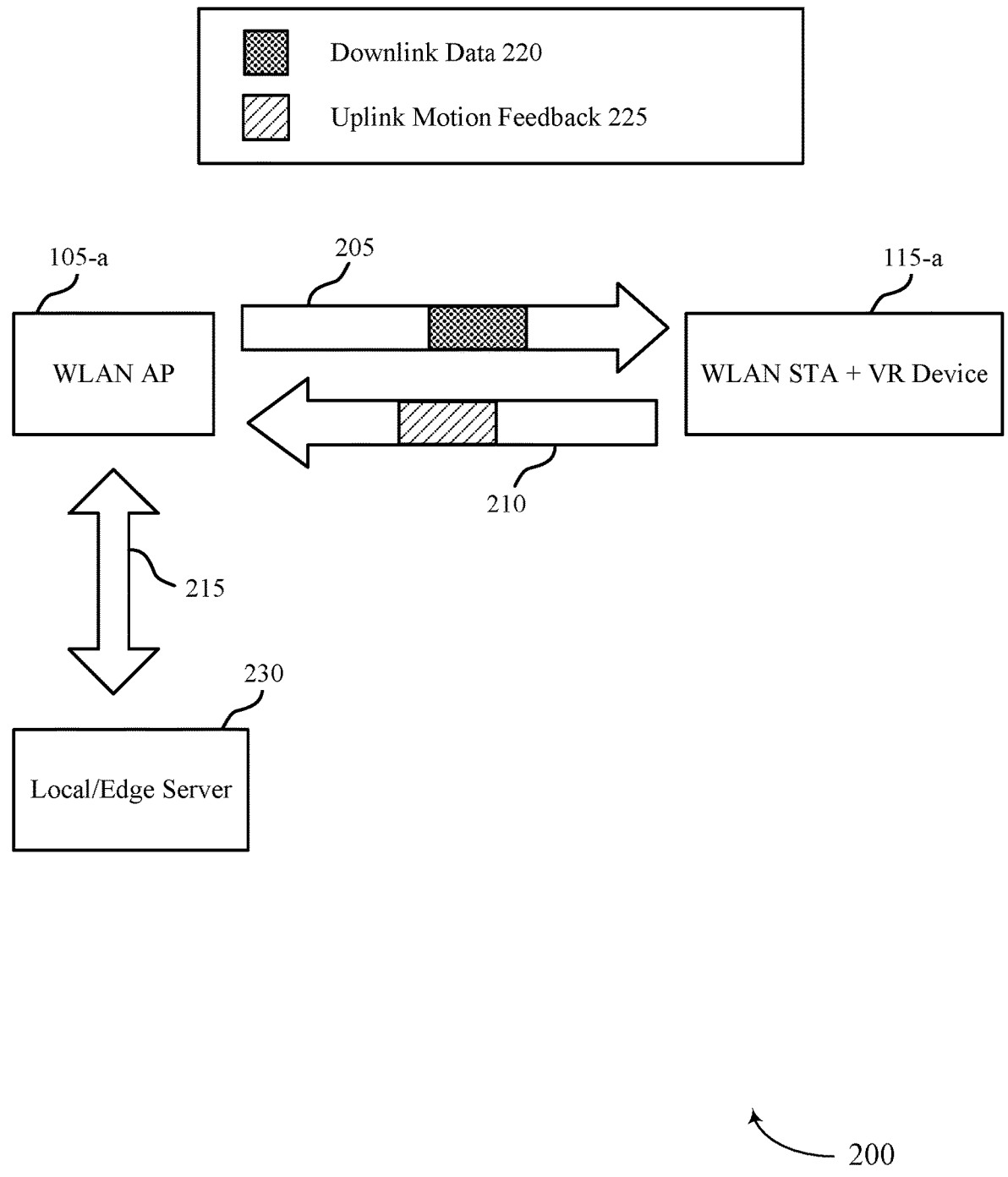

FIG. 2 illustrates an example of a WLAN 200 that supports techniques for reducing uplink feedback latency for VR devices in MU deployments in accordance with aspects of the present disclosure. The WLAN 200 may implement aspects of the WLAN 100. For example, the WLAN 200 may illustrate communication between an AP 105-a and a STA 115-a, which may be examples of corresponding devices described with reference to FIG. 1. In some examples, the STA 115-a may be an example of or otherwise function as a VR device, such as a VR headset, and may exchange signaling with the AP 105-a to update the AP 105-a on a current orientation of the STA 115-a (e.g., via uplink motion feedback 225) and to receive video frames from the AP 105-a (e.g., via downlink data 220) based on the current orientation of the STA 115-a.

For example, within the framework of the WLAN 200, the STA 115-a may provide the uplink motion feedback 225 to the AP 105-a via an uplink 210 and the AP 105-a may offload the VR processing to a local or edge server 230 (e.g., a PC) via a communication link 215 and may render the frames from the local or edge server 230 (e.g., the PC) to the STA 115-a wirelessly via a downlink 205. In some VR deployments, the communication over both the downlink 205 and the uplink 210 may be latency critical or otherwise highly sensitive to latency or delays. For example, over the downlink 205, the AP 105-a may transmit relatively long rendered video frames to the STA 115-a that are latency critical. As such, if the STA 115-a fails to receive the rendered video frames according to a low-latency timeline, the user experience at the STA 115-a may deteriorate. Further, over the uplink 210, the STA 115-a transmit latency sensitive motion data, such as IMU data (which may indicate an orientation of the STA 115-a in a 360 degree field), to the AP 105-a. As such, if the AP 105-a fails to receive the motion data from the STA 115-a according to a low-latency timeline, the AP 105-a may experience delays in obtaining updated rendered video frames for the STA 115-a based on the current orientation of the STA 115-a, which may also cause the user experience at the STA 115-a to deteriorate. In some cases, however, some WLAN frameworks may fail to provide mechanisms to guarantee latency metrics that can be met in such coupled (e.g., both in the downlink 205 and in the uplink 210) latency sensitive scenarios. Such a lack of a guarantee for such latency metrics may result in a greater likelihood for poor user experience, which may worsen in MU-VR deployments in which the AP 105-a and a number of STAs 115 contend for a channel or medium to transmit latency sensitive data.

In some cases, to avoid contention for the channel or medium by both the AP 105-a and the STA 115-a, the AP 105-a may periodically poll the STA 115-a at a fixed or regular interval to send the uplink motion feedback 225 (e.g., uplink motion data). In other words, the STA 115-a may refrain from transmitting the uplink motion feedback 225 indicating a current orientation of the STA 115-a unless the STA 115-a receives a request from the AP 105-a to transmit such uplink motion feedback 225. Although such fixed polling may result in contention avoidance between the AP 105-a and the STA 115-a, a polling period may be difficult to "fix". For example, if the AP 105-a fixes or otherwise sets the polling period too small (such that polling occurs too frequently), the STA 115-a may transmit the uplink motion feedback 225 more frequently than necessary, which may result in unnecessary airtime overhead and overall system congestion. Alternatively, if the AP 105-a fixes or otherwise sets the polling period too large (such that polling occurs too infrequently), the STA 115-a may transmit the uplink motion feedback 225 less frequently than may be optimal relative to the actual frequency of motion change at the STA 115-a, which may result in judder (e.g., a high persistence of frames despite a change in orientation) at the STA 115-a. Such judder may degrade the user experience at the STA 115-a and, in some use scenarios, may cause motion sickness.

Additionally, to implement a fixed polling interval, the AP 105-a and the STA 115-a may be constrained to tight synchronization, which may be difficult to achieve in some WLANs. For example, if the AP 105-a and the STA 115-a lose or are otherwise unable to achieve high synchronization, transmissions of the uplink motion feedback 225 may overlap or conflict with (in full or in part) polling occasions of other STAs 115 or with downlink data 220 from the AP 105-a. Further, fixed polling intervals may scale poorly in MU-VR scenarios in which the AP 105-a communicates with multiple STAs 115. For instance, in some MU scenarios, the AP 105-a may truncate its downlink frames and potentially waste transmission occasions to accommodate scheduled transmissions from multiple different STAs 115. For example, in an MU scenario involving the AP 105-a and four STAs 115, each STA 115 may be scheduled for transmission of uplink motion feedback 225 every 2 ms, which may result in a scheduling of a polling frame every 500 μs. Such high frequency polling frames may cause severe truncation of a duration of a downlink frame (e.g., as downlink frames may be truncated to less than 500 μs to accommodate polling a STA 115 every 500 μs), which may result in poor video quality at displays of the STAs 115.

In some implementations of the present disclosure, the STA 115-a may transmit the uplink motion feedback 225 as and when the STA 115-a detects that a motion change (e.g., an actual, measured, or predicted motion change) occurs at the STA 115-a. To support such dynamic transmission of the uplink motion feedback 225 to the AP 105-a and to facilitate mutual knowledge of the detected motion change at the STA 115-a, the STA 115-a may transmit an indication of a detected motion change to the AP 105-a based on detecting the motion change. In some aspects, the STA 115-a may transmit such an indication of a detected motion change to the AP 105-a via a BA feedback message responsive to downlink data 220 received from the AP 105-a, as described in more detail with reference to FIG. 3.

To detect or otherwise determine that a motion change has occurred (or is occurring) at the STA 115-a (e.g., to assist in the providing of dynamic uplink motion feedback 225), the STA 115-a may employ a motion change detection mechanism. The motion change detection mechanism may trigger the transmission of the uplink motion feedback 225 and may take various forms without exceeding the scope of the present disclosure. For instance, in some examples, the motion change detection mechanism may be a threshold detector. In such examples, the STA 115-a may implement the motion change detection mechanism based on comparing a first set of motion measurements, such as a first set of inertial measurements or IMUs, from a first time period with a second set of motion measurements, such as a second set of inertial measurements or IMUs, from a second time period. Accordingly, the STA 115-a may detect that a motion change has occurred or is occurring at the STA 115-a if the STA 115-a determines that a difference between the motion measurements from the first time period and the second time period satisfy a threshold (e.g., a motion change detection threshold). Such a threshold detector may be defined by Equation (1), below:

$$\text{Motion Change Detected} = \text{True if } IMU_{(t2)} - IMU_{(t1)} > \delta \quad (1)$$

As shown in Equation (1), $IMU_{(t2)}$ may correspond to the second set of inertial measurements from the second time period, $IMU_{(t1)}$ may correspond to the first set of inertial measurements from the first time period, and $\delta$ may correspond to the motion change detection threshold. Further, in some aspects, $t2 > t1$, and $\delta$ may be a tunable (e.g., changeable or configurable) threshold. For example, $\delta$ may be pre-configured at the STA 115-a, may be selected from a set of pre-configured options at the STA 115-a, may be generated or otherwise determined by the STA 115-a, or may be signaled to the STA 115-a from the AP 105-a, or any combination thereof. Further, although described in the context of a threshold detector, the motion change detection mechanism may include any processing operations, algorithms, systems, or signaling procedures that trigger the transmission of the uplink motion feedback 225 from the STA 115-a to the AP 105-a. For example, the motion change detection mechanism may include one or more machine learning systems. Further, the motion change detection mechanism may measure change in orientation of the STA 115-a or a rate of change in orientation of the STA 115-a (e.g., an aggressiveness of the orientation change), among other examples.

The STA 115-a, based on detecting the motion change at the STA 115-a and transmitting the indication of the motion change detection to the AP 105-a, may additionally transmit the uplink motion feedback 225 including motion data or the relevant IMU measurements or data to the AP 105-a. In some aspects, the STA 115-a may use or re-purpose some WLAN frame exchanges to improve (or reduce) the latency associated with transmitting the uplink motion feedback 225. For instance, in some examples, the STA 115-a may re-purpose a portion of the BA feedback message to piggyback the uplink motion feedback 225 in the BA feedback message if the STA 115-a detects a motion change. Such use or re-purposing of the BA feedback message to carry the uplink motion feedback 225 is illustrated by and described with reference to FIGS. 3 and 4. In some other examples, the STA 115-a may transmit the uplink motion feedback 225 via an uplink message different from the BA feedback message. In such examples, the AP 105-a, based on receiving the indication that the motion change was detected at the STA 115-a via the BA format, may avoid contending for the channel or medium prior to receiving the uplink message including the uplink motion feedback 225. As such, the STA 115-a may experience a greater likelihood for successfully transmitting the uplink motion feedback 225. Such use of the BA format and the separate uplink message is illustrated by and described with reference to FIG. 5.

Figure 3:
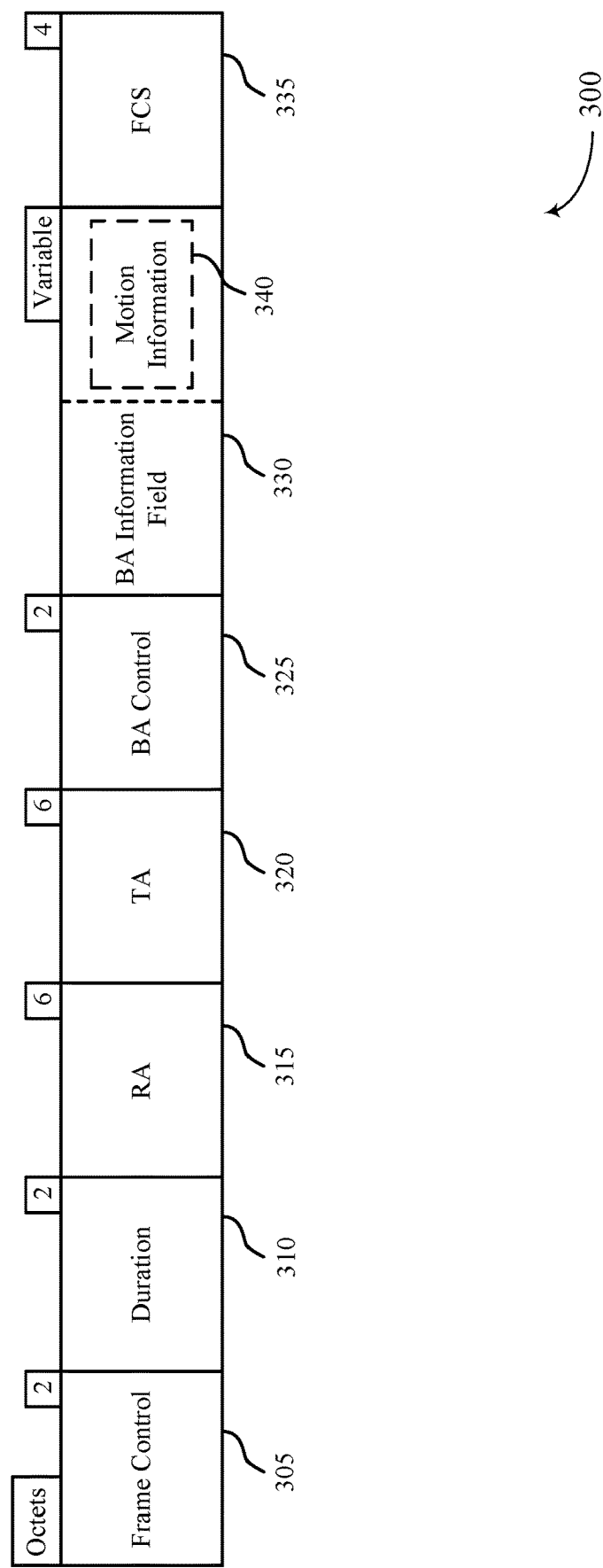
FIG. 3 illustrates an example of block acknowledgement (BA) format that supports techniques for reducing uplink feedback latency for VR devices in MU deployments in accordance with aspects of the present disclosure.

FIG. 3 illustrates an example of a BA format 300 that supports techniques for reducing uplink feedback latency for VR devices in MU deployments in accordance with aspects of the present disclosure. In some implementations, the BA format 300 may be implemented to realize aspects of the WLAN 100 or the WLAN 200. For example, a STA 115 may transmit a BA feedback message according to the BA format 300 to an AP 105 in response to downlink data (such as video frames) received from the AP 105 and the STA 115 may include an indication of whether or not a motion change has been detected at the STA 115 in the BA feedback message. In some examples, the STA 115 may additionally include uplink motion information 340 in the BA feedback message itself (as opposed to transmitting the uplink motion information 340 to the AP 105 via separate signaling).

As described herein, the STA 115 may transmit the BA feedback message in response to receiving downlink data or video frames from the AP 105. As such, the BA feedback message may include feedback, such as acknowledgement (ACK), of the downlink data received from the AP 105. The BA format 300 may include a number of fields or subfields and each field or subfield may include a number of octets. For example, the BA format 300 may include a frame control field 305 including 2 octets, a duration field 310 including 2 octets, a receiver address (RA) field 315 including 6 octets, a transmitter address (TA) field 320 including 6 octets, a BA control field 325 including 2 octets, a BA information field 330 including a variable number of octets, and a frame check sequence (FCS) field 335 including 4 octets.

In some implementations of the present disclosure, the STA 115 may use a BA control reserve bit or (multiple reserve bits) in the BA control field 325 of the BA feedback message to indicate that the STA 115 detects a motion change at the STA 115. Additionally, in examples in which the STA 115 includes the uplink motion information 340 (which may include a few tens of bytes) in the BA feedback message itself, the STA 115 may use the BA control reserve bit in the BA control field 325 to indicate that the uplink motion information 340 is also included in the BA feedback message. In such examples, the STA 115 may include the uplink motion information 340 in one or more fields of the BA feedback message or may include the uplink motion information 340 in a field dedicated for uplink motion information 340. For example, and as shown in the BA format 300, the STA 115 may include the uplink motion information 340 in the BA information field 330 of the BA feedback message. In other words, the STA 115 may append the uplink motion information 340 to the BA information field 330. In such examples in which the STA 115 appends the uplink motion information 340 to the BA feedback message (either to the BA information field 330 or to a different field or subfield in the BA feedback message), the STA 115 may avoid contention for transmitting the uplink motion information 340 (because the STA 115 may already have an opportunity for transmitting the BA feedback message), which may improve latency over both an uplink to the AP 105 and a downlink to the STA 115.

Figure 4:
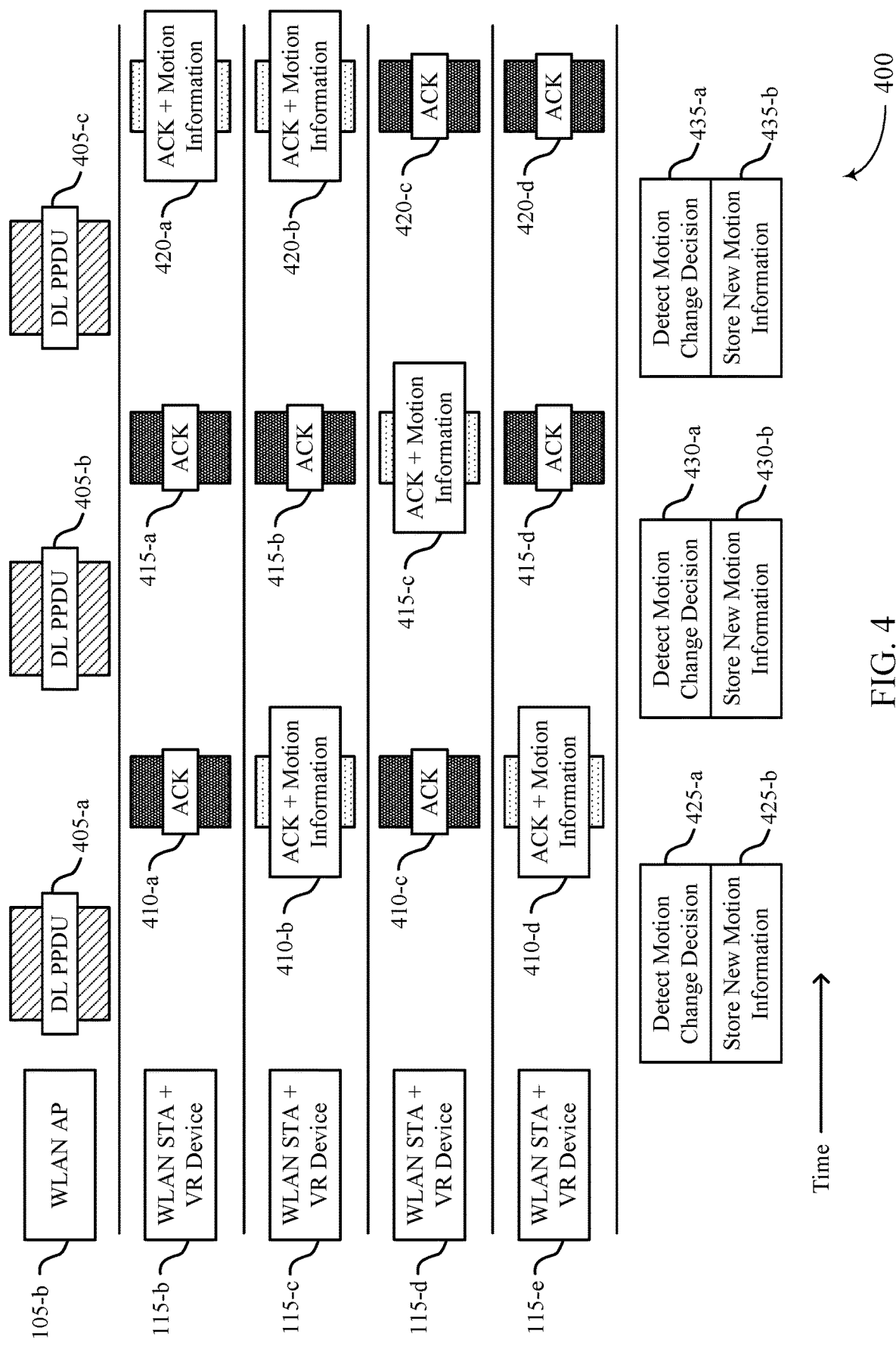
FIGS. 4 and 5 illustrate examples of communication sequences that support techniques for reducing uplink feedback latency for VR devices in MU deployments in accordance with aspects of the present disclosure.

FIG. 4 illustrates an example of a communication sequence 400 that supports techniques for reducing uplink feedback latency for VR devices in MU deployments in accordance with aspects of the present disclosure. In some examples, the communication sequence 400 may be implemented to realize aspects of the WLAN 100 or the WLAN 200. For example, the communication sequence 400 may illustrate communication between an AP 105-b and multiple STAs 115, including an STA 115-b, an STA 115-c, an STA 115-d, and an STA 115-e, in an MU-VR deployment scenario. In some examples, the multiple STAs 115 may monitor for motion changes of their respective STAs 115 and, if detected, may transmit an indication of the detected motion change and motion information associated with the detected motion change to the AP 105-b via a feedback message, such as a BA feedback message as described with reference to FIG. 3.

For example, the AP 105-b may transmit one or more downlink physical layer convergence procedure (PLCP) protocol data units (PPDUs) 405 to each of the multiple STAs 115 and the STAs 115 may transmit a feedback message (e.g., including an ACK) responsive to each downlink PPDU 405 received from the AP 105-b. A downlink PPDU 405 may include downlink data, such as rendered video frames, for various applications of the multiple STAs 115. The STAs 115 may also employ a motion change detection mechanism to detect whether or not the STAs 115 experience a motion change. In examples in which a STA 115 experiences a motion change, the STA 115 may include an indication of the motion change detection and current motion information in the feedback message. In such examples, airtime associated with a triggering for motion data, short interframe space (SIFS), uplink motion data, and ACK is saved, reducing latency of the uplink communication between the STAs 115 and the AP 105-b.

At a first transmission occasion, the AP 105-b may transmit a downlink PPDU 405-a to each of the multiple STAs 115. Additionally, at 425-a, each of the STAs 115 may detect a motion change decision of that STA 115. For example, at 425-a, a STA 115 may detect whether or not a motion change detection is true or whether the STA 115 has detected a motion change and has decided to transmit motion information to the AP 105-b. In some aspects, the STA 115-c and the STA 115-e may detect a motion change of the STA 115-c and the STA 115-e, respectively, and decide to transmit uplink motion information to the AP 105-b in a feedback message 410 responsive to the downlink PPDU 405-a. The STA 115-b and the STA 115-d, on the other hand, may have failed to detect a motion change of the STA 115-b and the STA 115-d, respectively, and may refrain from transmitting motion information to the AP 105-b in a feedback message 410 responsive to the downlink PPDU 405-a. Accordingly, at 425-b, the STA 115-c and the STA 115-e may store new or updated motion information of the STA 115-c and the STA 115-e, respectively, for transmission via feedback messages 410.

At a second transmission occasion, each of the STAs 115 may transmit feedback messages 410 to the AP 105-b responsive to the downlink PPDU 405-a. In some examples, the STA 115-b may transmit a feedback message 410-a including an ACK, the STA 115-c may transmit a feedback message 410-b including an ACK and motion information (based on the motion change detection of the STA 115-c), the STA 115-d may transmit a feedback message 410-c including an ACK, and the STA 115-e may transmit a feedback message 410-d including an ACK and motion information (based on the motion change detection of the STA 115-e).

At a third transmission occasion, the AP 105-b may transmit a downlink PPDU 405-b to each of the multiple STAs 115 (which may include updated downlink data or video frames for STAs 115 that detected a motion change). Additionally, at 430-a, each of the STAs 115 may detect a motion change decision of that STA 115. For example, at 430-a, a STA 115 may detect whether or not a motion change detection is true or whether the STA 115 has detected a motion change and has decided to transmit motion information to the AP 105-b. In some aspects, the STA 115-d may detect a motion change of the STA 115-d and decide to transmit uplink motion information to the AP 105-b in a feedback message 415 responsive to the downlink PPDU 405-b. The STA 115-b, the STA 115-c, and the STA 115-e, on the other hand, may have failed to detect a motion change of the STA 115-b, the STA 115-c, and the STA 115-e, respectively, and may refrain from transmitting motion information to the AP 105-b in a feedback message 415 responsive to the downlink PPDU 405-b. Accordingly, at 430-b, the STA 115-d may store new or updated motion information of the STA 115-d for transmission via a feedback message 415.

At a fourth transmission occasion, each of the STAs 115 may transmit feedback messages 415 to the AP 105-b responsive to the downlink PPDU 405-b. In some examples, the STA 115-b may transmit a feedback message 415-a including an ACK, the STA 115-c may transmit a feedback message 415-b including an ACK, the STA 115-d may transmit a feedback message 415-c including an ACK and motion information (based on the motion change detection of the STA 115-d), and the STA 115-e may transmit a feedback message 415-d including an ACK.

At a fifth transmission occasion, the AP 105-b may transmit a downlink PPDU 405-c to each of the multiple STAs 115 (which may include updated downlink data or video frames for STAs 115 that detected a motion change). Additionally, at 435-a, each of the STAs 115 may detect a motion change decision of that STA 115. For example, at 435-a, a STA 115 may detect whether or not a motion change detection is true or whether the STA 115 has detected a motion change and has decided to transmit motion information to the AP 105-b. In some aspects, the STA 115-b and the STA 115-c may detect a motion change of the STA 115-b and the STA 115-c, respectively, and decide to transmit uplink motion information to the AP 105-b in a feedback message 420 responsive to the downlink PPDU 405-c. The STA 115-d and the STA 115-e, on the other hand, may have failed to detect a motion change of the STA 115-d and the STA 115-e, respectively, and may refrain from transmitting motion information to the AP 105-b in a feedback message 420 responsive to the downlink PPDU 405-c. Accordingly, at 435-b, the STA 115-b and the STA 115-c may store the new motion information of the STA 115-*b* and the STA 115-*c*, respectively, for transmission via feedback messages 420.

At a sixth transmission occasion, each of the STAs 115 may transmit feedback messages 420 to the AP 105-*b* responsive to the downlink PPDU 405-*c*. In some examples, the STA 115-*b* may transmit a feedback message 420-*a* including an ACK and motion information (based on the motion change detection of the STA 115-*b*), the STA 115-*c* may transmit a feedback message 420-*b* including an ACK and motion information (based on the motion change detection of the STA 115-*c*), the STA 115-*d* may transmit a feedback message 420-*c* including an ACK, and the STA 115-*e* may transmit a feedback message 420-*d* including an ACK.

Further, although some signaling in the communication sequence 400 is illustrated by and described in the context of occurring during or at a same transmission occasion, such signaling may also occur at different transmission occasions without exceeding the scope of the present disclosure.

Figure 5:
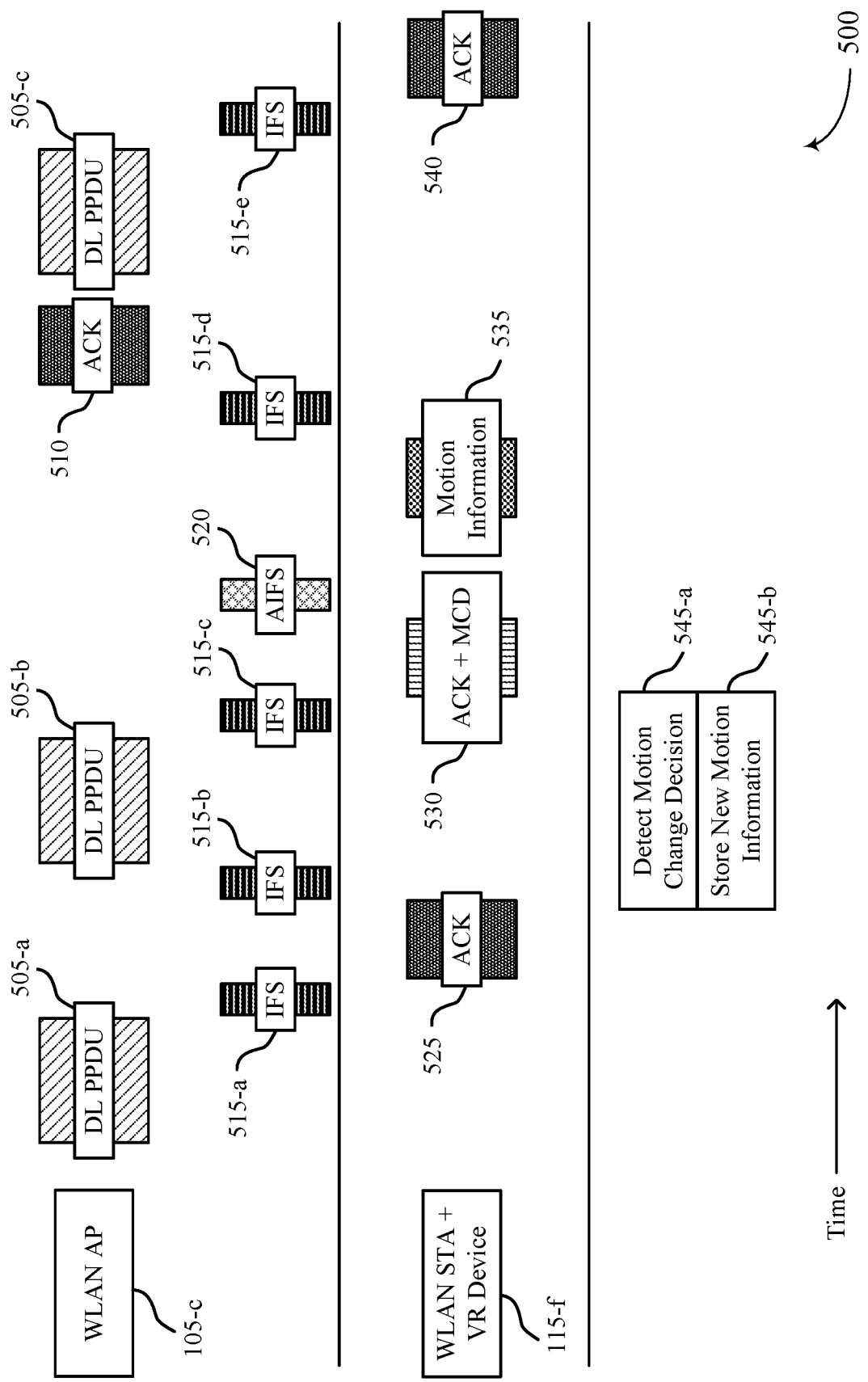

FIG. 5 illustrates an example of a communication sequence 500 that supports techniques for reducing uplink feedback latency for VR devices in MU deployments in accordance with aspects of the present disclosure. In some examples, the communication sequence 500 may be implemented to realize aspects of the WLAN 100 or the WLAN 200. For example, the communication sequence 500 may illustrate communication between an AP 105-*c* and an STA 115-*f* in an MU-VR deployment scenario. In some examples, the STA 115-*f* may monitor for motion changes at the STA 115-*f* and, if detected, may transmit an indication of the detected motion change via a feedback message, such as a BA feedback message as described with reference to FIG. 3, and may transmit motion information via a separate uplink message 535.

For example, the AP 105-*c* may transmit one or more downlink PPDUs 505 to the STA 115-*f* and the STA 115-*f* may transmit a feedback message (e.g., including an ACK) responsive to each downlink PPDU 505 received from the AP 105-*c*. A downlink PPDU 505 may include downlink data, such as rendered video frames, for an application of the STA 115-*f*. The STA 115-*f* may also employ a motion change detection mechanism to detect whether or not the STA 115-*f* experiences a motion change. In examples in which the STA 115-*f* experiences a motion change, the STA 115-*f* may transmit an indication of the motion change detection in the feedback message and may transmit the current motion information of the STA 115-*f* in the uplink message 535.

At a first transmission occasion, the AP 105-*c* may transmit a downlink PPDU 505-*a* to the STA 115-*f*. At a second transmission occasion, the STA 115-*f*, based on receiving the downlink PPDU 505-*a*, may transmit a feedback message 525 responsive to the downlink PPDU 505-*a* during an inter-frame space (IFS) 515-*a* and prior to an IFS 515-*b*.

At a third transmission occasion during the IFS 515-*b*, the AP 105-*c* may transmit a downlink PPDU 505-*b* to the STA 115-*f*. At 545-*a*, which may be during or proximate to the third transmission occasion, the STA 115-*f* may detect a motion change decision of the STA 115-*f*. For example, at 545-*a*, a STA 115-*f* may detect whether or not a motion change detection is true or whether the STA 115-*f* has detected a motion change and has decided to transmit motion information to the AP 105-*c*. In some aspects, the STA 115-*f* may detect a motion change of the STA 115-*f* and may decide to transmit uplink motion information to the AP 105-*c*. Accordingly, at 545-*b*, the STA 115-*f* may store new or updated motion information of the STA 115-*f* for transmission to the AP 105-*c*.

At a fourth transmission occasion, the STA 115-*f* may transmit a feedback message 530 responsive to the downlink PPDU 505-*b*, the feedback message 530 including an ACK and an indication of the motion change detection (which may be abbreviated MCD, and may function as Boolean information for the AP 105-*c*). In some aspects, the STA 115-*f* may transmit the feedback message 530 during an IFS 515-*c* and prior to an arbitration inter-frame spacing (AIFS) 520. At a fifth transmission occasion during the AIFS 520 and prior to an IFS 515-*d*, the STA 115-*f* may transmit the uplink message 535 including the motion information (based on including the motion change detection in the feedback message 530). In some examples, the AP 105-*c* may refrain from contending for the medium during the AIFS 520 based on receiving the motion change detection via the feedback message 530 such that the STA 115-*f* may transmit during the fifth transmission occasion and avoid any contention for channel access from the AP 105-*c*. As such, the STA 115-*f* may experience a greater likelihood for successfully transmitting the motion information.

At a sixth transmission occasion during the IFS 515-*d*, the AP 105-*c* may transmit a feedback message 510 including an ACK to the STA 115-*f* responsive to the uplink message 535. Additionally, at a seventh transmission occasion during the IFS 515-*d*, the AP 105-*c* may transmit a downlink PPDU 505-*c* to the STA 115-*f* prior to an IFS 515-*e*. In some examples, the downlink PPDU 505-*c* may include updated downlink data or updated video frames based on the motion change detection at the STA 115-*f*. At an eighth transmission occasion during the IFS 515-*e*, the STA 115-*f* may transmit a feedback message 540 including an ACK responsive to the downlink PPDU 505-*c*.

Further, although some signaling in the communication sequence 500 is illustrated by and described in the context of occurring during or at a same transmission occasion, such signaling may also occur at different transmission occasions without exceeding the scope of the present disclosure.

Figure 6:
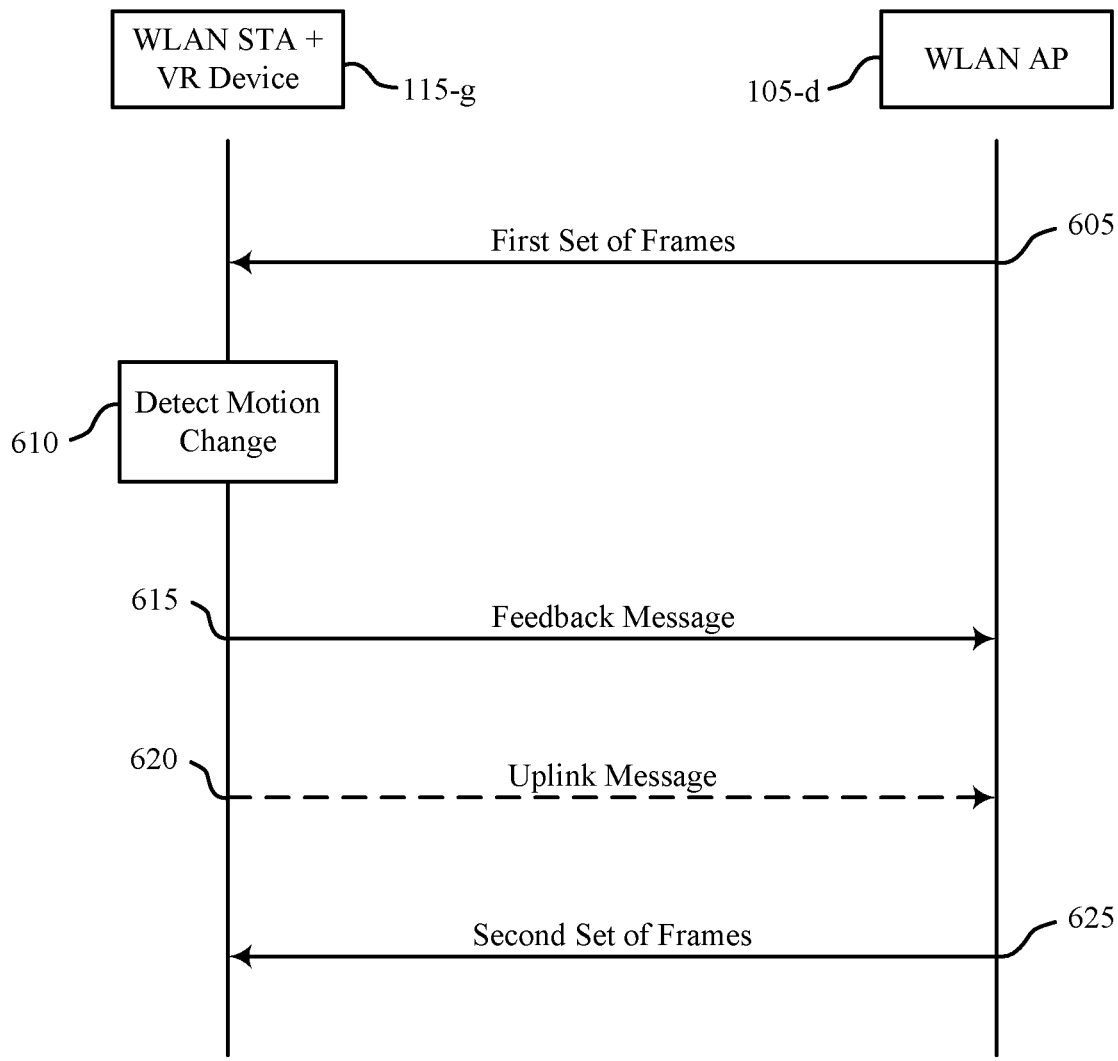
FIG. 6 illustrates an example of a process flow that supports techniques for reducing uplink feedback latency for VR devices in MU deployments in accordance with aspects of the present disclosure.

FIG. 6 illustrates an example of a process flow 600 that supports techniques for reducing uplink feedback latency for VR devices in MU deployments in accordance with aspects of the present disclosure. The process flow 600 may implement or be implemented to realize aspects of the WLAN 100 or the WLAN 200. For example, the process flow 600 may illustrate communication between an AP 105-*d* and an STA 115-*g*, which may be examples of corresponding devices described with reference to FIGS. 1 and 2. In some implementations, the STA 115-*g* may transmit uplink motion information, such as a set of inertial measurements or IMUs, to the AP 105-*d* based on detecting a motion change at the STA 115-*g*.

At 605, the STA 115-*g* may receive, from the AP 105-*d*, a first set of frames for an application of the STA 115-*g*. In some examples, the first set of frames may be conveyed via a downlink PPDU and may include rendered video frames to be displayed at the STA 115-*g*.

At 610, the STA 115-*g* may detect a motion change of the STA 115-*g*. In some examples, the STA 115-*g* may detect the motion change based on comparing a first set of inertial measurements from a first time period with a second set of inertial measurements from a second time period to obtain a difference in inertial measurements between the first time period and the second time period. In such examples, the STA 115-*g* may detect the motion change if the difference in the inertial measurements satisfies a motion detection threshold. Additional examples of motion change detection mechanisms that the STA 115-*g* may employ to detect the motion change of the STA 115-*g* are described herein, including with reference to FIG. 2.

At 615, the STA 115-*g* may transmit, to the AP 105-*d*, a feedback message responsive to the first set of frames and indicating that the motion change is detected. In some examples, the STA 115-*g* may indicate that the motion change is detected via a bit in the feedback message, which may be an example of a BA feedback message as descried in more detail with reference to FIG. 3. In some implementations, the STA 115-*g* may also transmit a set of inertial measurements (e.g., uplink motion information or feedback) of the STA 115-*g* to the AP 105-*d* via the feedback message. In such implementations, the STA 115-*g* may append the set of inertial measurements to a BA information field in the feedback message. In some other implementations, the STA 115-*g* may transmit the set of inertial measurements of the STA 115-*g* via separate signaling from the feedback message.

At 620, for example, the STA 115-*g* may transmit, to the AP 105-*d*, the set of inertial measurements of the STA 115-*g* via an uplink message. In such examples, the AP 105-*d* may refrain from contending for the medium based on receiving the indication of the motion change detection via the feedback message at 615, which may increase the likelihood of the STA 115-*g* to successfully transmit the set of inertial measurements to the AP 105-*d*.

At 625, the STA 115-*g* may receive, from the AP 105-*d*, a second set of frames for the application of the STA 115-*g* based on the feedback message indicating that the motion change is detected at the STA 115-*g* and based on the set of inertial measurements of the STA 115-*g*. For example, the second set of frames may include updated frames based on an updated orientation of the STA 115-*g*.

Figure 7:
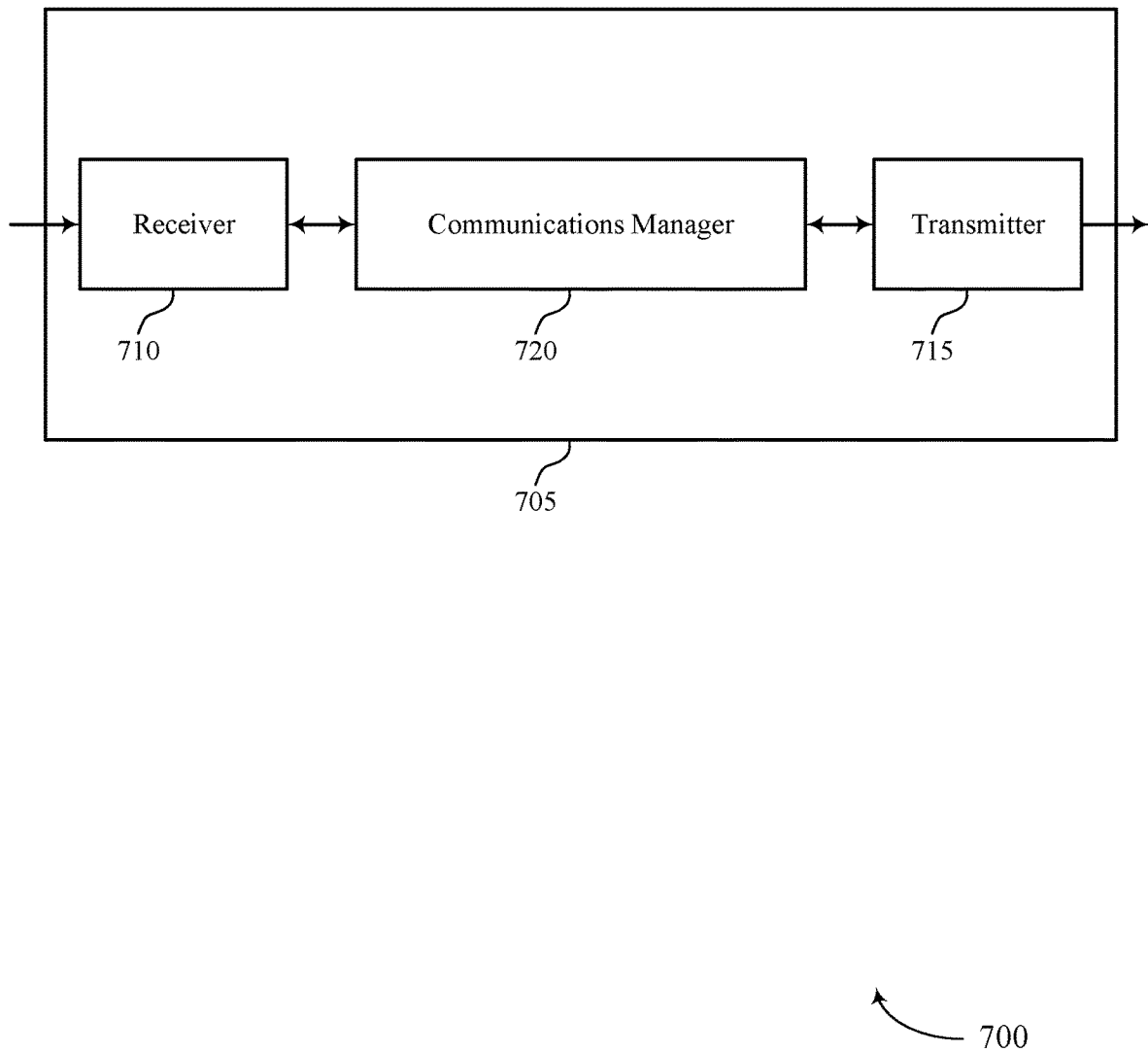
FIGS. 7 and 8 show block diagrams of devices that support techniques for reducing uplink feedback latency for VR devices in MU deployments in accordance with aspects of the present disclosure.

FIG. 7 shows a block diagram 700 of a device 705 that supports techniques for reducing uplink feedback latency for VR devices in MU deployments in accordance with aspects of the present disclosure. The device 705 may be an example of aspects of an STA as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for reducing uplink feedback latency for VR devices in MU deployments). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for reducing uplink feedback latency for VR devices in MU deployments). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for reducing uplink feedback latency for VR devices in MU deployments as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a wireless station in accordance with examples as disclosed herein. For example, the communications manager 720 may be configured as or otherwise support a means for receiving, from an access point, a first set of multiple frames for an application of the wireless station. The communications manager 720 may be configured as or otherwise support a means for detecting a motion change of the wireless station. The communications manager 720 may be configured as or otherwise support a means for transmitting, to the access point a feedback message responsive to the first set of multiple frames and indicating that the motion change is detected and a set of inertial measurements associated with the wireless station based on detecting the motion change of the wireless station. The communications manager 720 may be configured as or otherwise support a means for receiving, from the access point, a second set of multiple frames for the application of the wireless station based on the feedback message indicating that the motion change is detected and the set of inertial measurements associated with the wireless station.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources.

Figure 8:
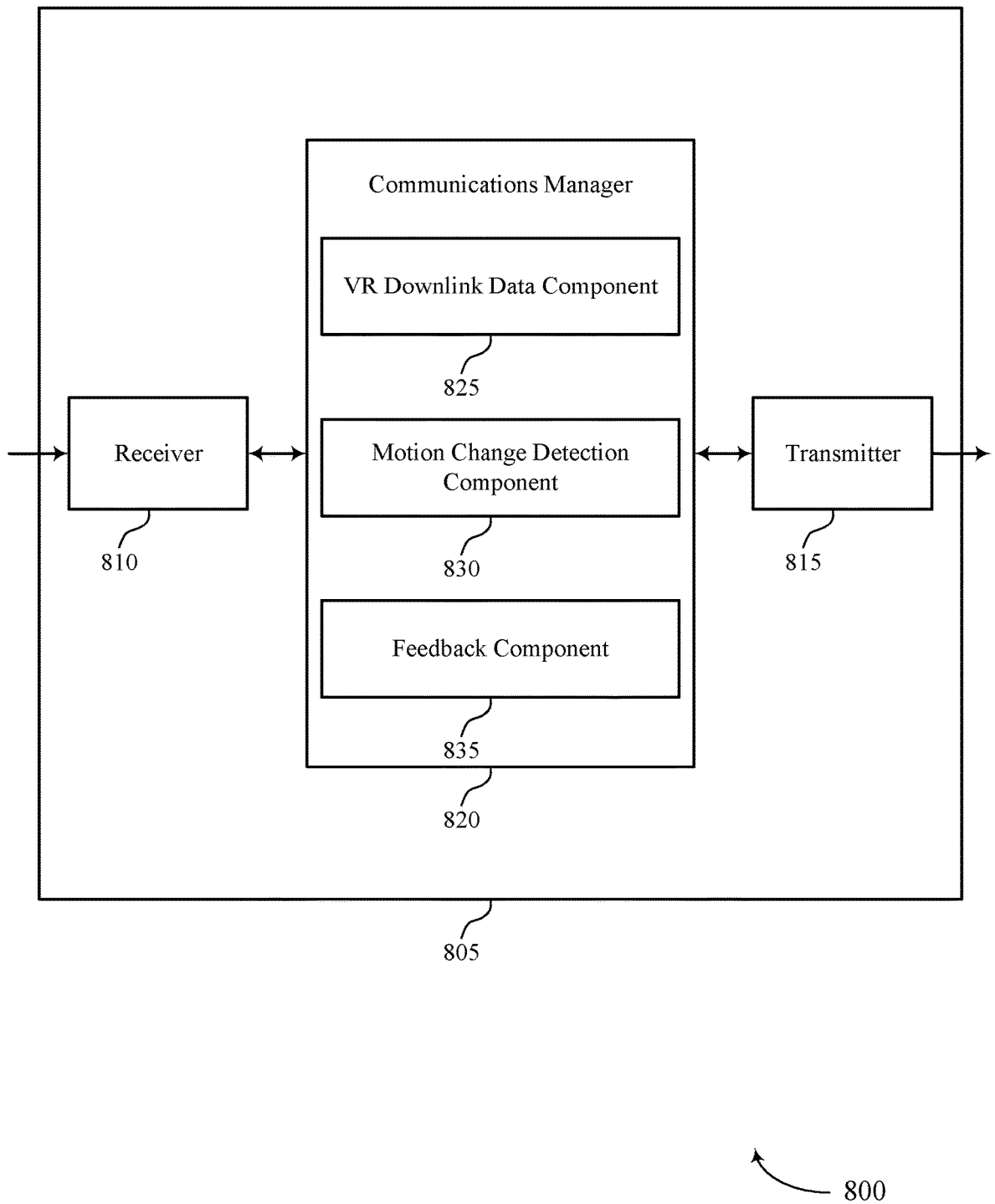

FIG. 8 shows a block diagram 800 of a device 805 that supports techniques for reducing uplink feedback latency for VR devices in MU deployments in accordance with aspects of the present disclosure. The device 805 may be an example of aspects of a device 705 or an STA 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for reducing uplink feedback latency for VR devices in MU deployments). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for reducing uplink feedback latency for VR devices in MU deployments). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for reducing uplink feedback latency for VR devices in MU deployments as described herein. For example, the communications manager 820 may include a VR downlink data component 825, a motion change detection component 830, a feedback component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a wireless station in accordance with examples as disclosed herein. The VR downlink data component 825 may be configured as or otherwise support a means for receiving, from an access point, a first set of multiple frames for an application of the wireless station. The motion change detection component 830 may be configured as or otherwise support a means for detecting a motion change of the wireless station. The feedback component 835 may be configured as or otherwise support a means for transmitting, to the access point a feedback message responsive to the first set of multiple frames and indicating that the motion change is detected and a set of inertial measurements associated with the wireless station based on detecting the motion change of the wireless station. The VR downlink data component 825 may be configured as or otherwise support a means for receiving, from the access point, a second set of multiple frames for the application of the wireless station based on the feedback message indicating that the motion change is detected and the set of inertial measurements associated with the wireless station.

Figure 9:
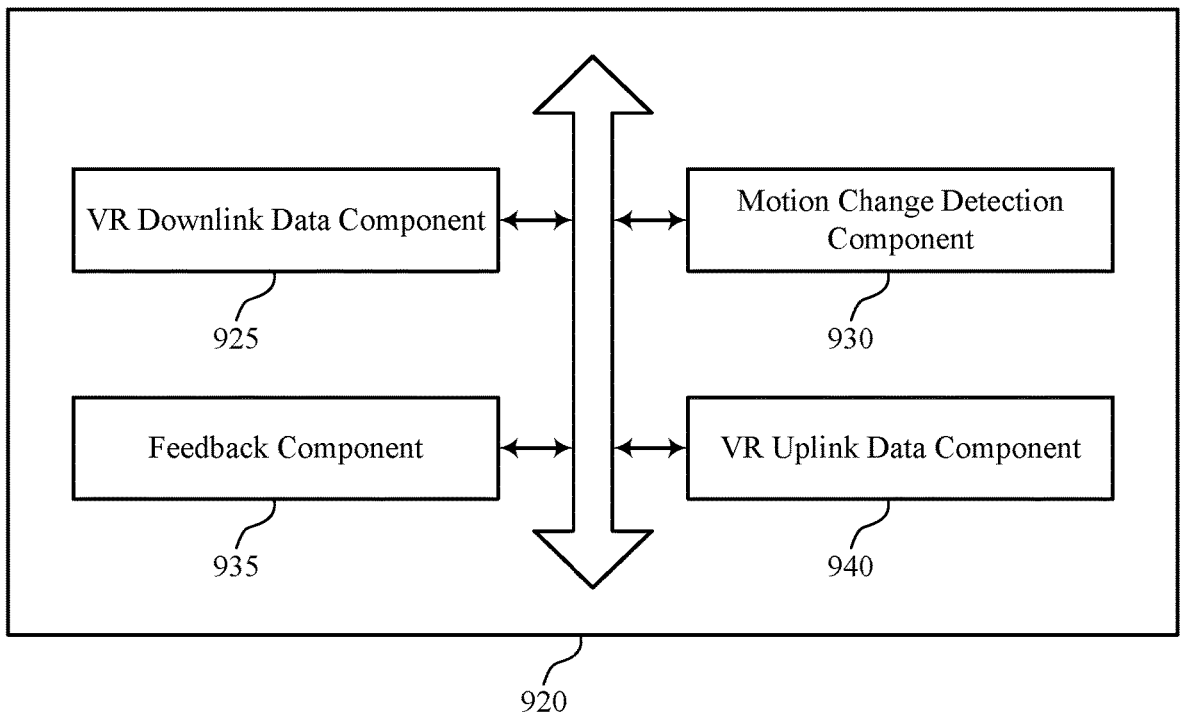
FIG. 9 shows a block diagram of a communications manager that supports techniques for reducing uplink feedback latency for VR devices in MU deployments in accordance with aspects of the present disclosure.

FIG. 9 shows a block diagram 900 of a communications manager 920 that supports techniques for reducing uplink feedback latency for VR devices in MU deployments in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for reducing uplink feedback latency for VR devices in MU deployments as described herein. For example, the communications manager 920 may include a VR downlink data component 925, a motion change detection component 930, a feedback component 935, a VR uplink data component 940, or any combination thereof. Each of these components may communicate, directly or indirectly, with one another (e.g., via one or more buses).

The communications manager 920 may support wireless communication at a wireless station in accordance with examples as disclosed herein. The VR downlink data component 925 may be configured as or otherwise support a means for receiving, from an access point, a first set of multiple frames for an application of the wireless station. The motion change detection component 930 may be configured as or otherwise support a means for detecting a motion change of the wireless station. The feedback component 935 may be configured as or otherwise support a means for transmitting, to the access point a feedback message responsive to the first set of multiple frames and indicating that the motion change is detected and a set of inertial measurements associated with the wireless station based on detecting the motion change of the wireless station. In some examples, the VR downlink data component 925 may be configured as or otherwise support a means for receiving, from the access point, a second set of multiple frames for the application of the wireless station based on the feedback message indicating that the motion change is detected and the set of inertial measurements associated with the wireless station.

In some examples, to support detecting the motion change of the wireless station, the motion change detection component 930 may be configured as or otherwise support a means for comparing a first set of inertial measurements from a first time period with the set of inertial measurements from a second time period to obtain a difference in inertial measurements between the first time period and the second time period. In some examples, to support detecting the motion change of the wireless station, the motion change detection component 930 may be configured as or otherwise support a means for determining that the difference in inertial measurements satisfies a motion change detection threshold.

In some examples, to support transmitting the set of inertial measurements associated with the wireless station, the feedback component 935 may be configured as or otherwise support a means for transmitting an indication of the set of inertial measurements associated with the wireless station within a block acknowledgement information field of the feedback message. In some examples, to support transmitting the feedback message indicating that the motion change is detected, the feedback component 935 may be configured as or otherwise support a means for transmitting an indication that the block acknowledgement information field includes the set of inertial measurements associated with the wireless station via a bit within a block acknowledgement control field of the feedback message.

In some examples, to support transmitting the feedback message indicating that the motion change is detected, the feedback component 935 may be configured as or otherwise support a means for transmitting an indication that the motion change is detected via a bit in the feedback message during a first time period. In some examples, to support transmitting the set of inertial measurements associated with the wireless station, the VR uplink data component 940 may be configured as or otherwise support a means for transmitting an uplink message including the set of inertial measurements associated with the wireless station during a second time period based on transmitting the indication that the motion change is detected via the bit in the feedback message during the first time period.

In some examples, there is an absence of downlink data between the first time period and the second time period based at least in part on transmitting the indication that the motion change is detected during the first time period. In some examples, to support receiving the first set of multiple frames for the application of the wireless station, the VR downlink data component 925 may be configured as or otherwise support a means for receiving a set of multiple video frames for a virtual reality application of the wireless station.

Figure 10:
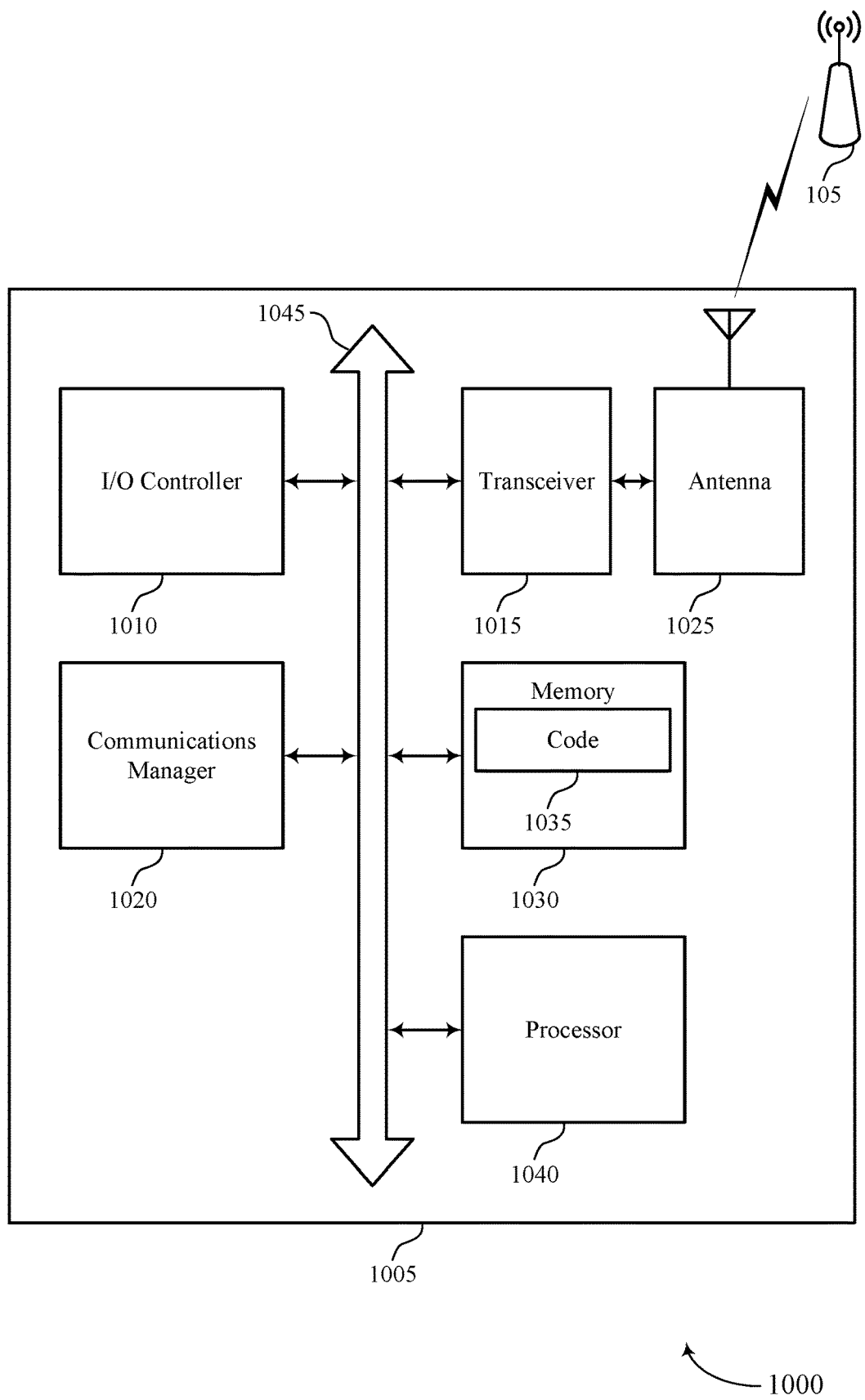
FIG. 10 shows a diagram of a system including a device that supports techniques for reducing uplink feedback latency for VR devices in MU deployments in accordance with aspects of the present disclosure.

FIG. 10 shows a diagram of a system 1000 including a device 1005 that supports techniques for reducing uplink feedback latency for VR devices in MU deployments in accordance with aspects of the present disclosure. The device 1005 may be an example of or include the components of a device 705, a device 805, or an STA as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In some other cases, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets and provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random-access memory (RAM) and read-only memory (ROM). The memory 1030 may store computer-readable, computer-executable code 1035 including instructions that, when executed by the processor 1040, cause the device 1005 to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for reducing uplink feedback latency for VR devices in MU deployments). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a wireless station in accordance with examples as disclosed herein. For example, the communications manager 1020 may be configured as or otherwise support a means for receiving, from an access point, a first set of multiple frames for an application of the wireless station. The communications manager 1020 may be configured as or otherwise support a means for detecting a motion change of the wireless station. The communications manager 1020 may be configured as or otherwise support a means for transmitting, to the access point a feedback message responsive to the first set of multiple frames and indicating that the motion change is detected and a set of inertial measurements associated with the wireless station based on detecting the motion change of the wireless station. The communications manager 1020 may be configured as or otherwise support a means for receiving, from the access point, a second set of multiple frames for the application of the wireless station based on the feedback message indicating that the motion change is detected and the set of inertial measurements associated with the wireless station.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

Figure 11:
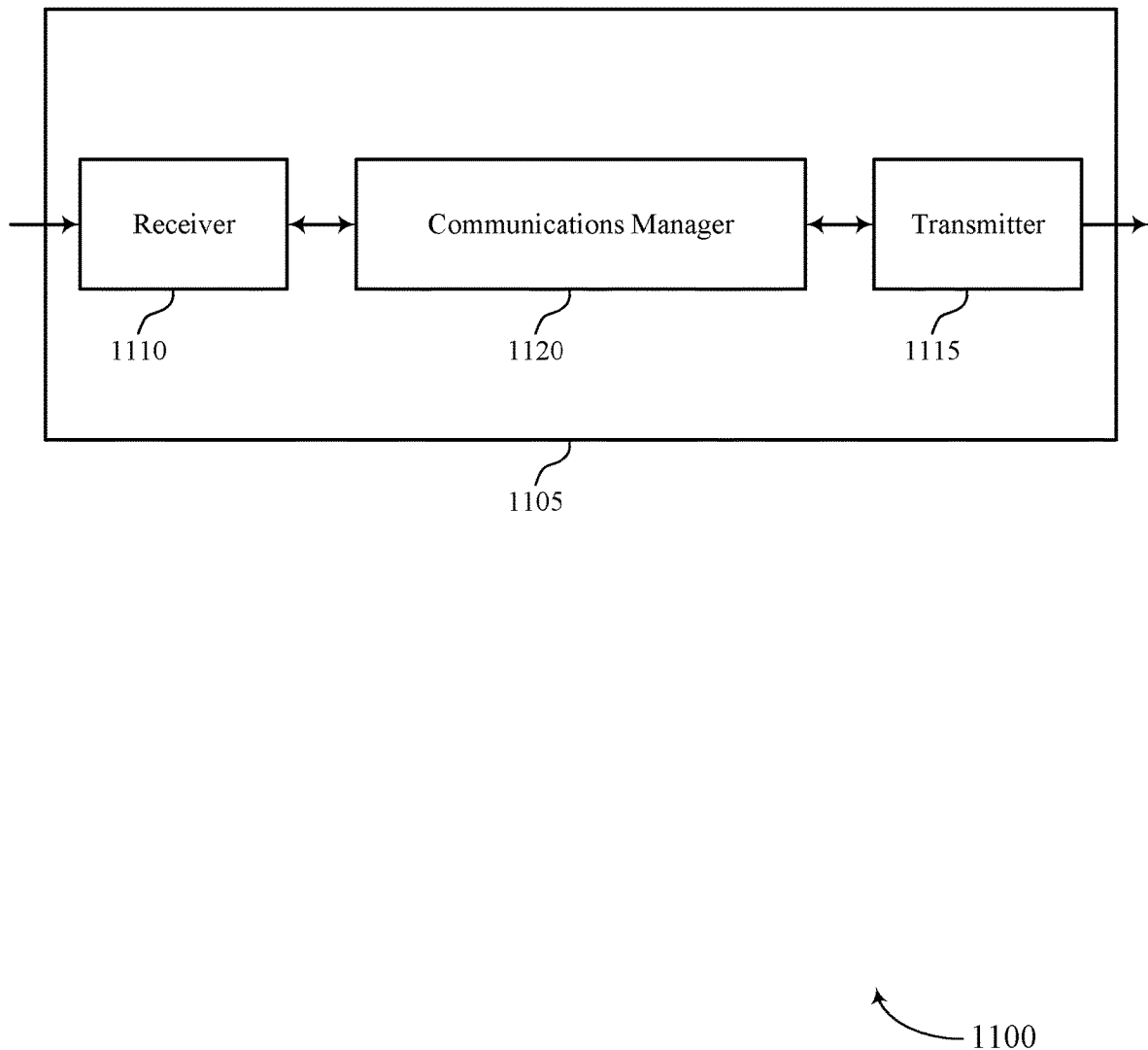
FIGS. 11 and 12 show block diagrams of devices that support techniques for reducing uplink feedback latency for VR devices in MU deployments in accordance with aspects of the present disclosure.

FIG. 11 shows a block diagram 1100 of a device 1105 that supports techniques for reducing uplink feedback latency for VR devices in MU deployments in accordance with aspects of the present disclosure. The device 1105 may be an example of aspects of an AP as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for reducing uplink feedback latency for VR devices in MU deployments). Information may be passed on to other components of the device 1105. The receiver 1110 may utilize a single antenna or a set of multiple antennas.

The transmitter 1115 may provide a means for transmitting signals generated by other components of the device 1105. The transmitter 1115 may utilize a single antenna or a set of multiple antennas.

The communications manager 1120, the receiver 1110, the transmitter 1115, or various combinations thereof or various components thereof may be examples of means for performing various aspects of techniques for reducing uplink feedback latency for VR devices in MU deployments as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at an access point in accordance with examples as disclosed herein. For example, the communications manager 1120 may be configured as or otherwise support a means for transmitting, to a wireless station, a first set of multiple frames for an application of the wireless station. The communications manager 1120 may be configured as or otherwise support a means for receiving, from the wireless station a feedback message responsive to the first set of multiple frames and indicating that a motion change of the wireless station is detected and a set of inertial measurements associated with the wireless station based on the indicating that the motion change of the wireless station is detected. The communications manager 1120 may be configured as or otherwise support a means for transmitting, to the wireless station, a second set of multiple frames for the application of the wireless station based on the feedback message indicating that the motion change is detected.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more efficient utilization of communication resources.

Figure 12:
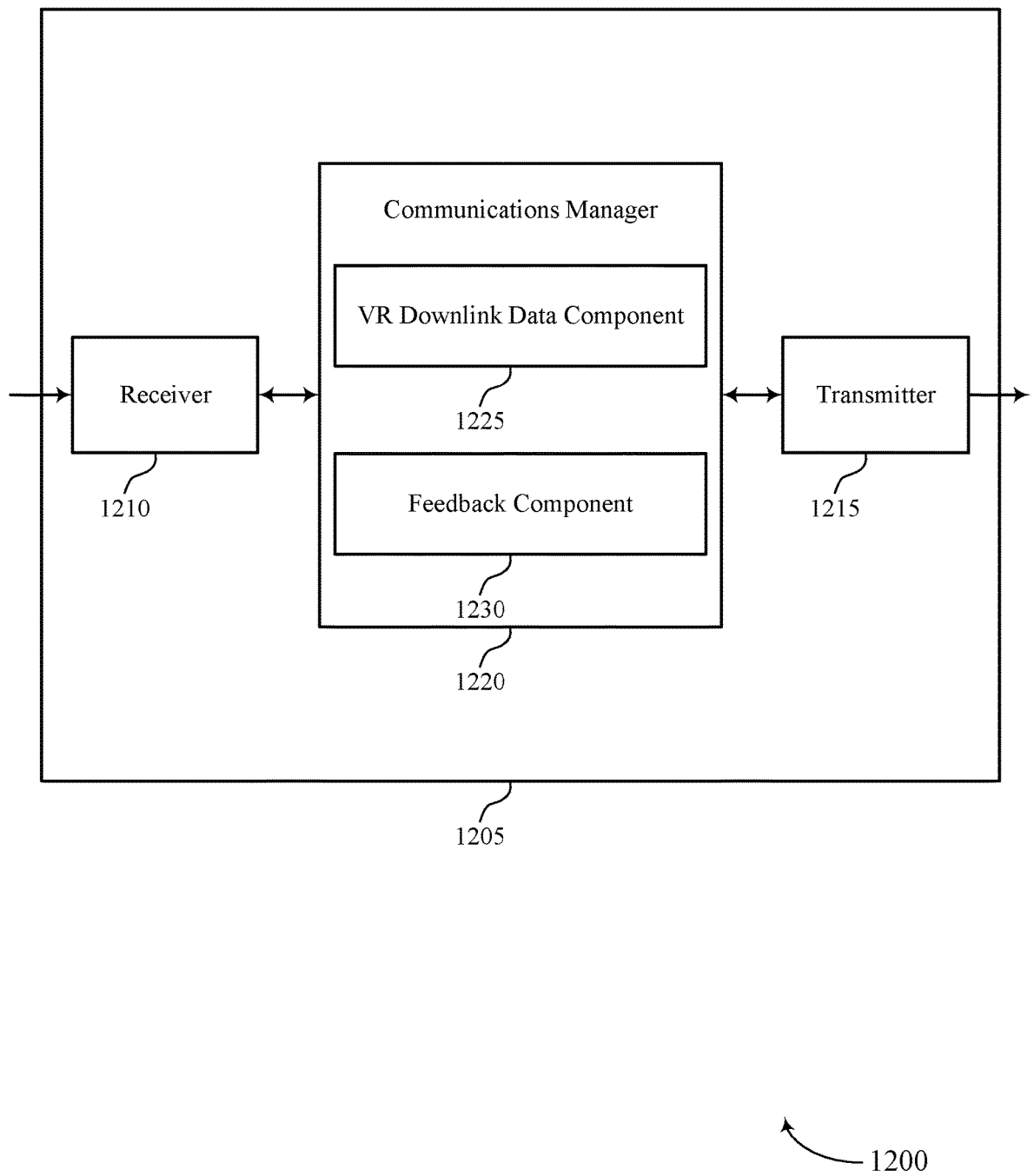

FIG. 12 shows a block diagram 1200 of a device 1205 that supports techniques for reducing uplink feedback latency for VR devices in MU deployments in accordance with aspects of the present disclosure. The device 1205 may be an example of aspects of a device 1105 or an AP 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for reducing uplink feedback latency for VR devices in MU deployments). Information may be passed on to other components of the device 1205. The receiver 1210 may utilize a single antenna or a set of multiple antennas.

The transmitter 1215 may provide a means for transmitting signals generated by other components of the device 1205. The transmitter 1215 may utilize a single antenna or a set of multiple antennas.

The device 1205, or various components thereof, may be an example of means for performing various aspects of techniques for reducing uplink feedback latency for VR devices in MU deployments as described herein. For example, the communications manager 1220 may include a VR downlink data component 1225 a feedback component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at an access point in accordance with examples as disclosed herein. The VR downlink data component 1225 may be configured as or otherwise support a means for transmitting, to a wireless station, a first set of multiple frames for an application of the wireless station. The feedback component 1230 may be configured as or otherwise support a means for receiving, from the wireless station a feedback message responsive to the first set of multiple frames and indicating that a motion change of the wireless station is detected and a set of inertial measurements associated with the wireless station based on the indicating that the motion change of the wireless station is detected. The VR downlink data component 1225 may be configured as or otherwise support a means for transmitting, to the wireless station, a second set of multiple frames for the application of the wireless station based on the feedback message indicating that the motion change is detected.

Figure 13:
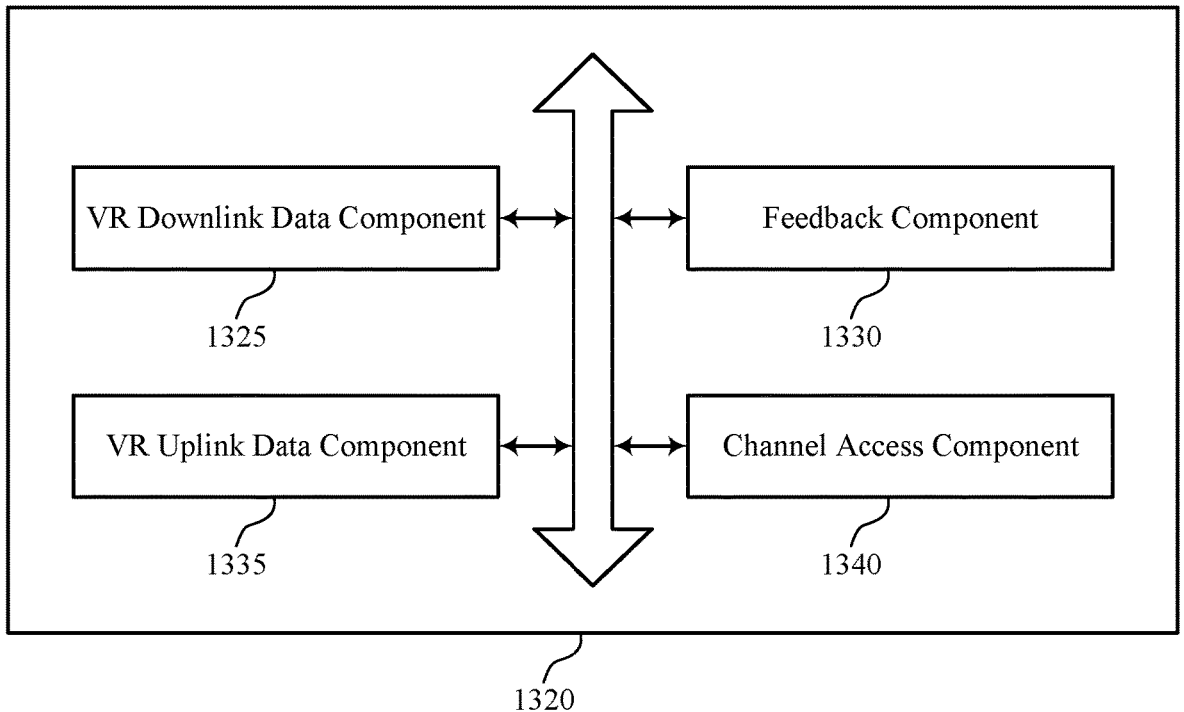
FIG. 13 shows a block diagram of a communications manager that supports techniques for reducing uplink feedback latency for VR devices in MU deployments in accordance with aspects of the present disclosure.

FIG. 13 shows a block diagram 1300 of a communications manager 1320 that supports techniques for reducing uplink feedback latency for VR devices in MU deployments in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for reducing uplink feedback latency for VR devices in MU deployments as described herein. For example, the communications manager 1320 may include a VR downlink data component 1325, a feedback component 1330, a VR uplink data component 1335, a channel access component 1340, or any combination thereof. Each of these components may communicate, directly or indirectly, with one another (e.g., via one or more buses).

The communications manager 1320 may support wireless communication at an access point in accordance with examples as disclosed herein. The VR downlink data component 1325 may be configured as or otherwise support a means for transmitting, to a wireless station, a first set of multiple frames for an application of the wireless station. The feedback component 1330 may be configured as or otherwise support a means for receiving, from the wireless station a feedback message responsive to the first set of multiple frames and indicating that a motion change of the wireless station is detected and a set of inertial measurements associated with the wireless station based on the indicating that the motion change of the wireless station is detected. In some examples, the VR downlink data component 1325 may be configured as or otherwise support a means for transmitting, to the wireless station, a second set of multiple frames for the application of the wireless station based on the feedback message indicating that the motion change is detected.

In some examples, to support receiving the set of inertial measurements associated with the wireless station, the feedback component 1330 may be configured as or otherwise support a means for receiving an indication of the set of inertial measurements associated with the wireless station within a block acknowledgement information field of the feedback message. In some examples, to support receiving the feedback message indicating that the motion change is detected, the feedback component 1330 may be configured as or otherwise support a means for receiving an indication that the block acknowledgement information field includes the set of inertial measurements associated with the wireless station via a bit within a block acknowledgement control field of the feedback message.

In some examples, to support receiving the feedback message indicating that the motion change is detected, the feedback component 1330 may be configured as or otherwise support a means for receiving an indication that the motion change is detected via a bit in the feedback message during a first time period. In some examples, to support receiving the set of inertial measurements associated with the wireless station, the VR uplink data component 1335 may be configured as or otherwise support a means for receiving, from the wireless station, an uplink message including the set of inertial measurements associated with the wireless station during a second time period based on receiving the indication that the motion change is detected via the bit in the feedback message during the first time period.

In some examples, the channel access component 1340 may be configured as or otherwise support a means for refraining from transmitting downlink data between the first time period and the second time period based on receiving the indication that the motion change is detected during the first time period and receiving the uplink message including the set of inertial measurements associated with the wireless station during the second time period. In some examples, to support transmitting the first set of multiple frames for the application of the wireless station, the VR downlink data component 1325 may be configured as or otherwise support a means for transmitting a set of multiple video frames for a virtual reality application of the wireless station.

In some examples, the access point operates in an MU-VR scenario, and the VR downlink data component 1325 may be configured as or otherwise support a means for transmitting, to a set of multiple wireless stations, a first set of multiple video frames for virtual reality applications of the set of multiple wireless stations. In some examples, the access point operates in an MU-VR scenario, and the feedback component 1330 may be configured as or otherwise support a means for receiving, from one or more wireless stations of the set of multiple wireless stations feedback messages responsive to the first set of multiple video frames and indicating that respective motion changes of the one or more wireless stations are detected and sets of inertial measurements associated with the one or more wireless stations based on the indicating that the respective motion changes of the one or more wireless stations are detected. In some examples, the access point operates in an MU-VR scenario, and the VR downlink data component 1325 may be configured as or otherwise support a means for transmitting, to the one or more wireless stations, a second set of multiple video frames for the virtual reality applications of the one or more wireless stations based on the feedback messages indicating that the respective motion changes are detected.

Figure 14:
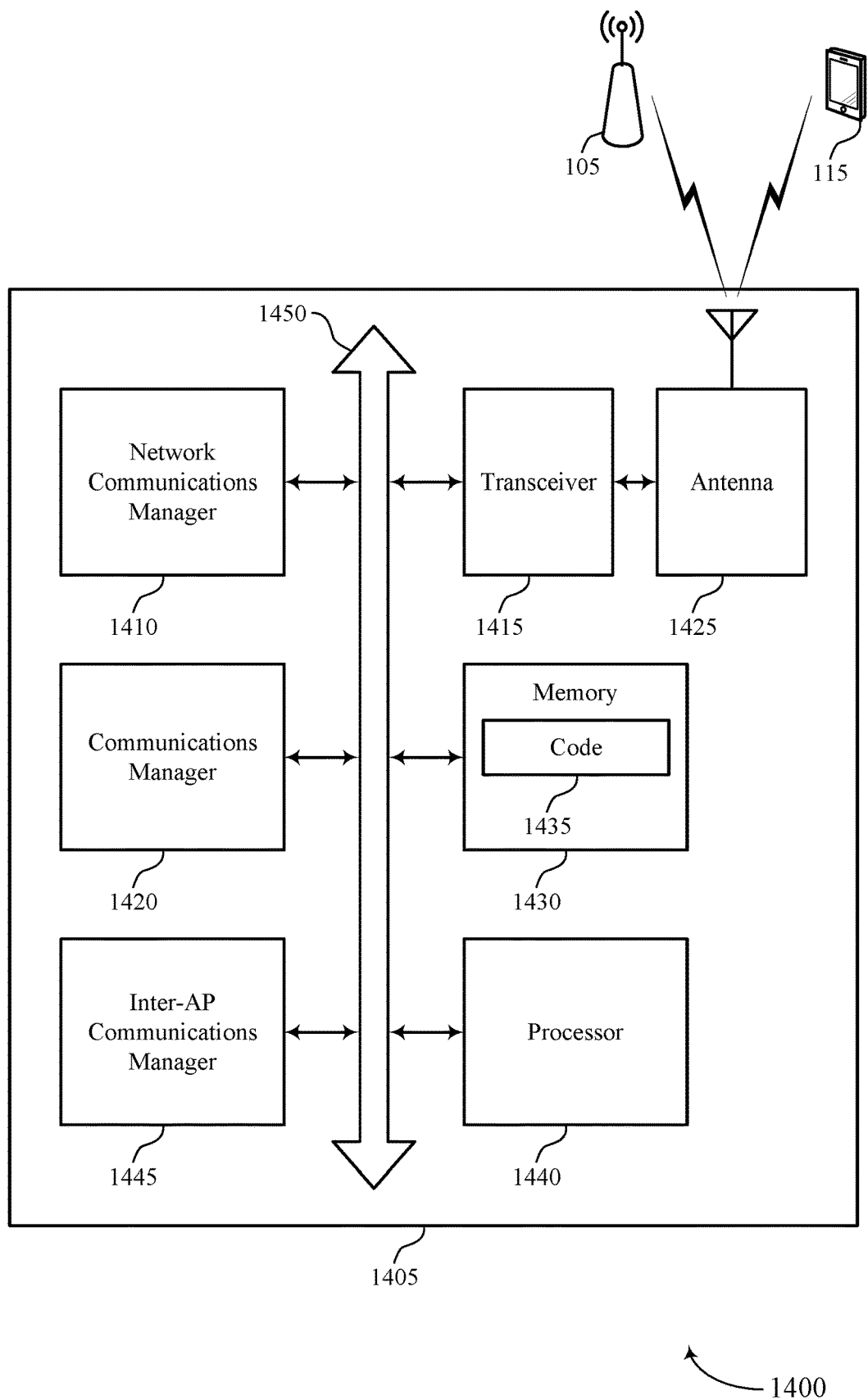
FIG. 14 shows a diagram of a system including a device that supports techniques for reducing uplink feedback latency for VR devices in MU deployments in accordance with aspects of the present disclosure.

FIG. 14 shows a diagram of a system 1400 including a device 1405 that supports techniques for reducing uplink feedback latency for VR devices in MU deployments in accordance with aspects of the present disclosure. The device 1405 may be an example of or include the components of a device 1105, a device 1205, or an AP as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-AP communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network (e.g., via one or more wired backhaul links). For example, the network communications manager 1410 may manage the transfer of data communications for client devices, such as one or more STAs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets and provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for reducing uplink feedback latency for VR devices in MU deployments). For example, the device 1405 or a component of the device 1405 may include a processor 1440 and memory 1430 coupled to the processor 1440, the processor 1440 and memory 1430 configured to perform various functions described herein.

The inter-AP communications manager 1445 may manage communications with other APs 105, and may include a controller or scheduler for controlling communications with STAs 115 in cooperation with other APs 105. For example, the inter-AP communications manager 1445 may coordinate scheduling for transmissions to APs 105 for various interference mitigation techniques such as beamforming or joint transmission. In some examples, the inter-AP communications manager 1445 may provide an X2 interface within an LTE/LTE-A wireless communication network technology to provide communication between APs 105.

The communications manager 1420 may support wireless communication at an access point in accordance with examples as disclosed herein. For example, the communications manager 1420 may be configured as or otherwise support a means for transmitting, to a wireless station, a first set of multiple frames for an application of the wireless station. The communications manager 1420 may be configured as or otherwise support a means for receiving, from the wireless station a feedback message responsive to the first set of multiple frames and indicating that a motion change of the wireless station is detected and a set of inertial measurements associated with the wireless station based on the indicating that the motion change of the wireless station is detected. The communications manager 1420 may be configured as or otherwise support a means for transmitting, to the wireless station, a second set of multiple frames for the application of the wireless station based on the feedback message indicating that the motion change is detected.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

Figure 15:
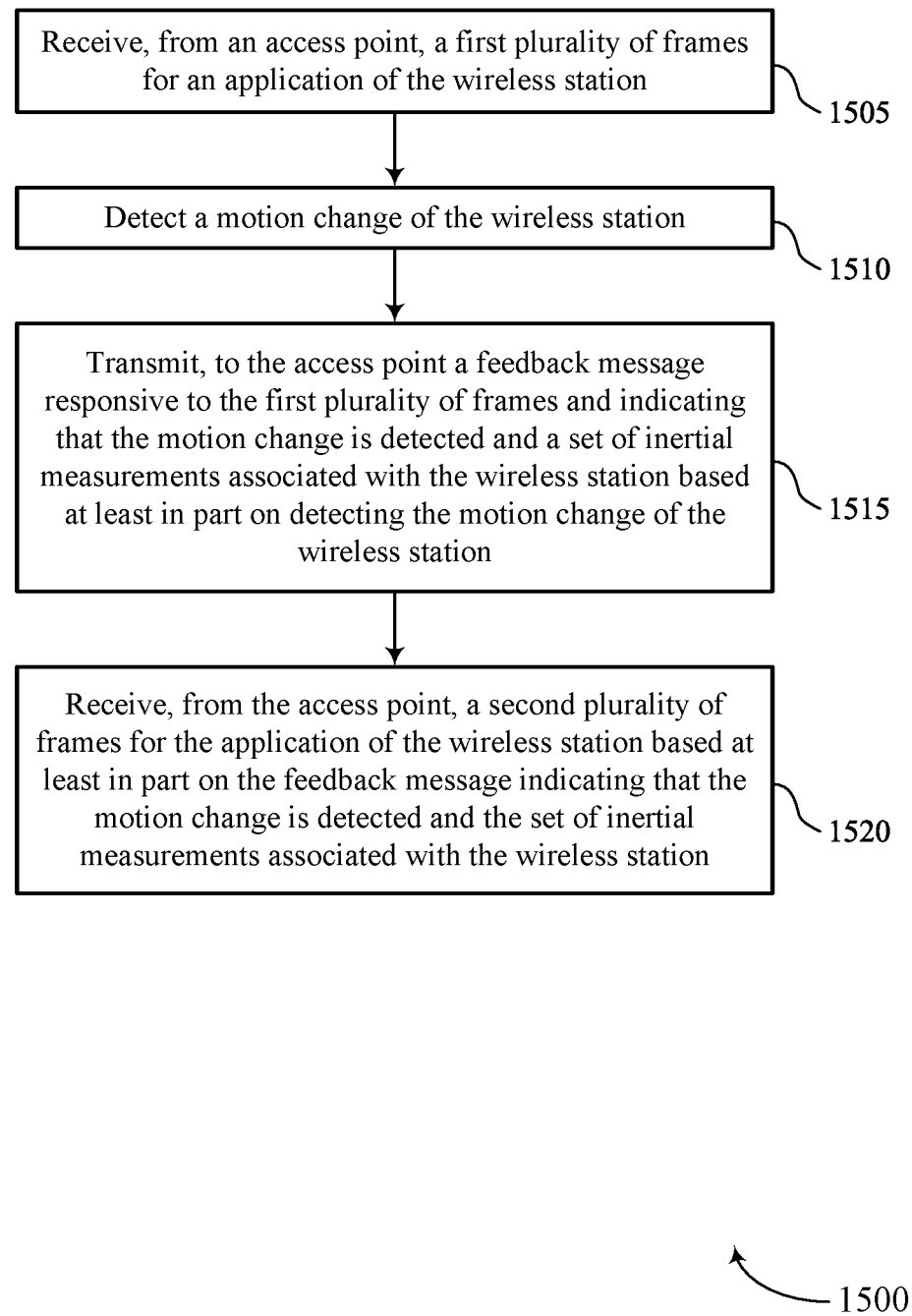
FIGS. 15 through 17 show flowcharts illustrating methods that support techniques for reducing uplink feedback latency for VR devices in MU deployments in accordance with aspects of the present disclosure.

FIG. 15 shows a flowchart illustrating a method 1500 that supports techniques for reducing uplink feedback latency for VR devices in MU deployments in accordance with aspects of the present disclosure. The operations of the method 1500 may be implemented by an STA or its components as described herein. For example, the operations of the method 1500 may be performed by an STA as described with reference to FIGs. FIG. 1 through 10. In some examples, an STA may execute a set of instructions to control the functional elements of the STA to perform the described functions. Additionally or alternatively, the STA may perform aspects of the described functions using special-purpose hardware.

At 1505, the method may include receiving, from an access point, a first set of multiple frames for an application of the wireless station. The operations of 1505 may be performed in accordance with examples as disclosed herein. In some examples, aspects of the operations of 1505 may be performed by a VR downlink data component 925 as described with reference to FIG. 9.

At 1510, the method may include detecting a motion change of the wireless station. The operations of 1510 may be performed in accordance with examples as disclosed herein. In some examples, aspects of the operations of 1510 may be performed by a motion change detection component 930 as described with reference to FIG. 9.

At 1515, the method may include transmitting, to the access point a feedback message responsive to the first set of multiple frames and indicating that the motion change is detected and a set of inertial measurements associated with the wireless station based on detecting the motion change of the wireless station. The operations of 1515 may be performed in accordance with examples as disclosed herein. In some examples, aspects of the operations of 1515 may be performed by a feedback component 935 as described with reference to FIG. 9.

At 1520, the method may include receiving, from the access point, a second set of multiple frames for the application of the wireless station based on the feedback message indicating that the motion change is detected and the set of inertial measurements associated with the wireless station. The operations of 1520 may be performed in accordance with examples as disclosed herein. In some examples, aspects of the operations of 1520 may be performed by a VR downlink data component 925 as described with reference to FIG. 9.

Figure 16:
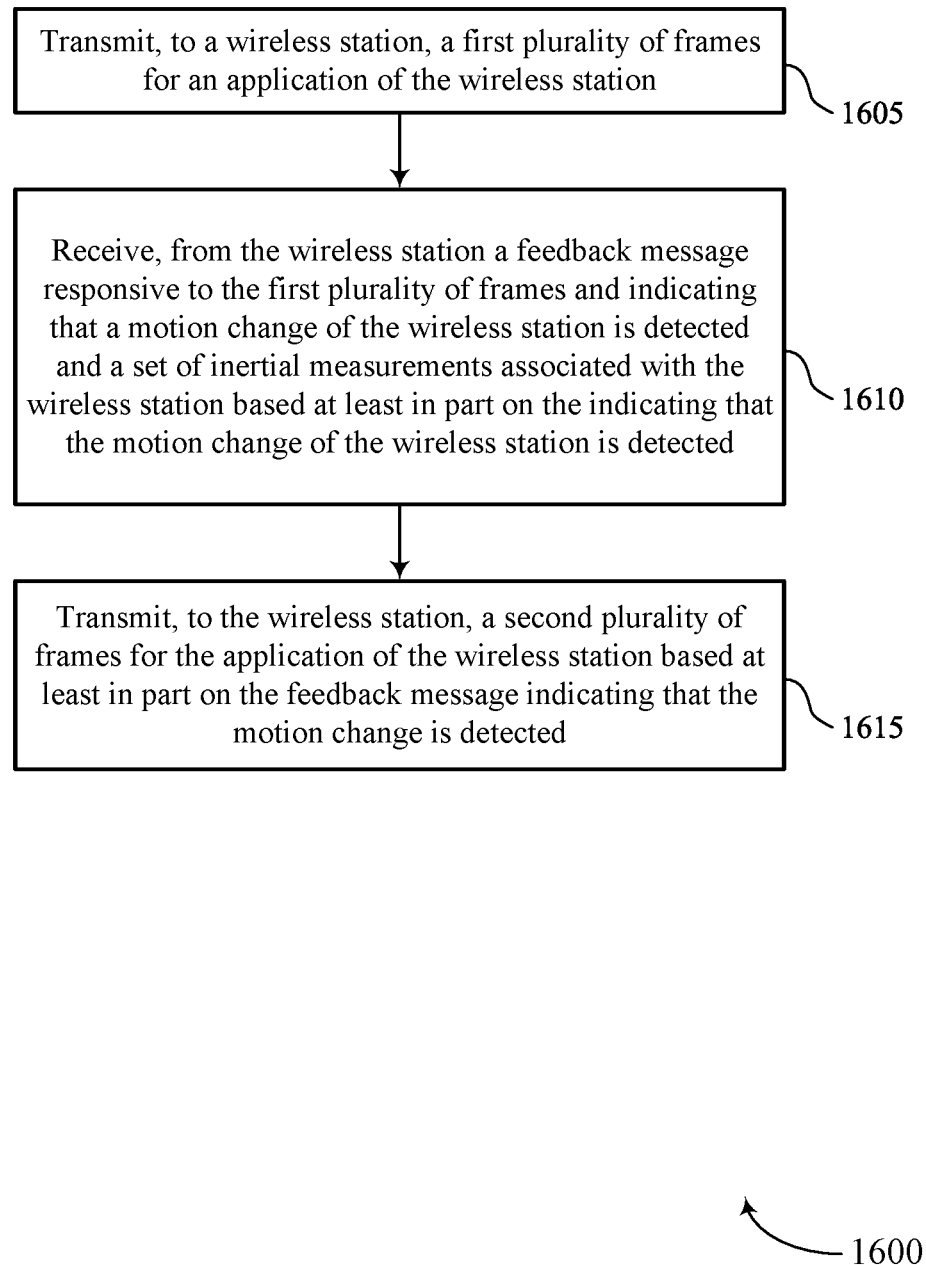

FIG. 16 shows a flowchart illustrating a method 1600 that supports techniques for reducing uplink feedback latency for VR devices in MU deployments in accordance with aspects of the present disclosure. The operations of the method 1600 may be implemented by an AP or its components as described herein. For example, the operations of the method 1600 may be performed by an AP as described with reference to FIGS. FIGS. 1 through 6 and 11 through 14. In some examples, an AP may execute a set of instructions to control the functional elements of the AP to perform the described functions. Additionally or alternatively, the AP may perform aspects of the described functions using special-purpose hardware.

At 1605, the method may include transmitting, to a wireless station, a first set of multiple frames for an application of the wireless station. The operations of 1605 may be performed in accordance with examples as disclosed herein. In some examples, aspects of the operations of 1605 may be performed by a VR downlink data component 1325 as described with reference to FIG. 13.

At 1610, the method may include receiving, from the wireless station a feedback message responsive to the first set of multiple frames and indicating that a motion change of the wireless station is detected and a set of inertial measurements associated with the wireless station based on the indicating that the motion change of the wireless station is detected. The operations of 1610 may be performed in accordance with examples as disclosed herein. In some examples, aspects of the operations of 1610 may be performed by a feedback component 1330 as described with reference to FIG. 13.

At 1615, the method may include transmitting, to the wireless station, a second set of multiple frames for the application of the wireless station based on the feedback message indicating that the motion change is detected. The operations of 1615 may be performed in accordance with examples as disclosed herein. In some examples, aspects of the operations of 1615 may be performed by a VR downlink data component 1325 as described with reference to FIG. 13.

Figure 17:
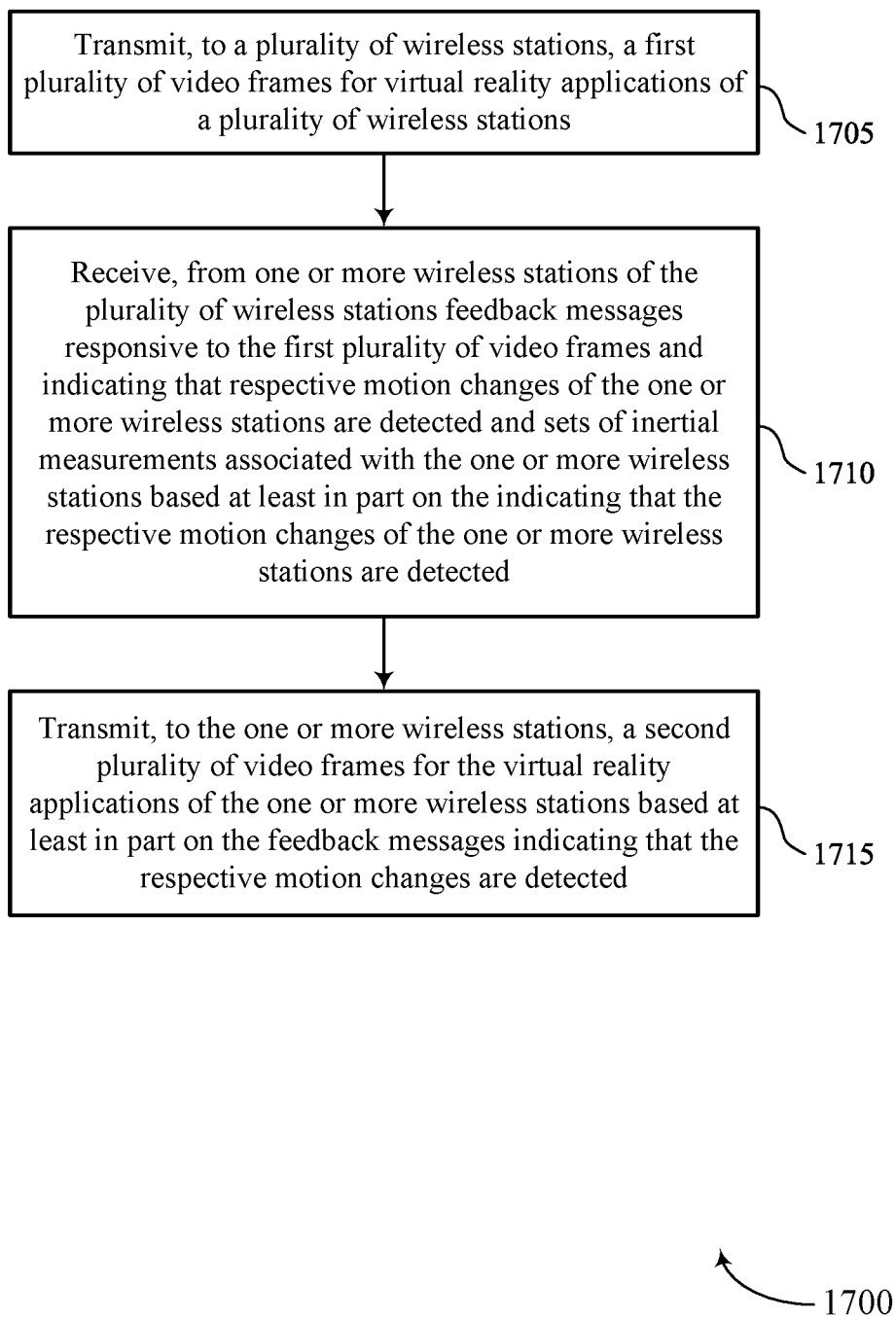

FIG. 17 shows a flowchart illustrating a method 1700 that supports techniques for reducing uplink feedback latency for VR devices in MU deployments in accordance with aspects of the present disclosure. The operations of the method 1700 may be implemented by an AP or its components as described herein. For example, the operations of the method 1700 may be performed by an AP as described with reference to FIGS. FIGS. 1 through 6 and 11 through 14. In some examples, an AP may execute a set of instructions to control the functional elements of the AP to perform the described functions. Additionally or alternatively, the AP may perform aspects of the described functions using special-purpose hardware.

At 1705, the method may include transmitting, to a set of multiple wireless stations, a first set of multiple video frames for virtual reality applications of a set of multiple wireless stations. The operations of 1705 may be performed in accordance with examples as disclosed herein. In some examples, aspects of the operations of 1705 may be performed by a VR downlink data component 1325 as described with reference to FIG. 13.

At 1710, the method may include receiving, from one or more wireless stations of the set of multiple wireless stations feedback messages responsive to the first set of multiple video frames and indicating that respective motion changes of the one or more wireless stations are detected and sets of inertial measurements associated with the one or more wireless stations based on the indicating that the respective motion changes of the one or more wireless stations are detected. The operations of 1710 may be performed in accordance with examples as disclosed herein. In some examples, aspects of the operations of 1710 may be performed by a feedback component 1330 as described with reference to FIG. 13.

At 1715, the method may include transmitting, to the one or more wireless stations, a second set of multiple video frames for the virtual reality applications of the one or more wireless stations based on the feedback messages indicating that the respective motion changes are detected. The operations of 1715 may be performed in accordance with examples as disclosed herein. In some examples, aspects of the operations of 1715 may be performed by a VR downlink data component 1325 as described with reference to FIG. 13.

The following provides an overview of aspects of the present disclosure:

Aspect 1: A method for wireless communication at a wireless STA, comprising: receiving, from an AP, a first plurality of frames for an application of the wireless STA; detecting a motion change of the wireless STA; transmitting, to the AP a feedback message responsive to the first plurality of frames and indicating that the motion change is detected and a set of inertial measurements associated with the wireless STA based at least in part on detecting the motion change of the wireless STA; and receiving, from the AP, a second plurality of frames for the application of the wireless STA based at least in part on the feedback message indicating that the motion change is detected and the set of inertial measurements associated with the wireless STA.

Aspect 2: The method of aspect 1, wherein detecting the motion change of the wireless STA further comprises: comparing a first set of inertial measurements from a first time period with the set of inertial measurements from a second time period to obtain a difference in inertial measurements between the first time period and the second time period; and determining that the difference in inertial measurements satisfies a motion change detection threshold.

Aspect 3: The method of any of aspects 1 through 2, wherein transmitting the set of inertial measurements associated with the wireless STA further comprises: transmitting an indication of the set of inertial measurements associated with the wireless STA within a BA information field of the feedback message.

Aspect 4: The method of aspect 3, wherein transmitting the feedback message indicating that the motion change is detected further comprises: transmitting an indication that the BA information field includes the set of inertial measurements associated with the wireless STA via a bit within a BA control field of the feedback message.

Aspect 5: The method of any of aspects 1 through 2, wherein transmitting the feedback message indicating that the motion change is detected further comprises: transmitting an indication that the motion change is detected via a bit in the feedback message during a first time period.

Aspect 6: The method of aspect 5, wherein transmitting the set of inertial measurements associated with the wireless STA further comprises: transmitting an uplink message including the set of inertial measurements associated with the wireless STA during a second time period based at least in part on transmitting the indication that the motion change is detected via the bit in the feedback message during the first time period.

Aspect 7: The method of aspect 6, wherein there is an absence of downlink data between the first time period and the second time period based at least in part transmitting the indication that the motion change is detected during the first time period.

Aspect 8: The method of any of aspects 1 through 7, wherein receiving the first plurality of frames for the application of the wireless STA further comprises: receiving a plurality of video frames for a VR application of the wireless STA.

Aspect 9: A method for wireless communication at an AP, comprising: transmitting, to a wireless STA, a first plurality of frames for an application of the wireless STA; receiving, from the wireless STA a feedback message responsive to the first plurality of frames and indicating that a motion change of the wireless STA is detected and a set of inertial measurements associated with the wireless STA based at least in part on the indicating that the motion change of the wireless STA is detected; and transmitting, to the wireless STA, a second plurality of frames for the application of the wireless STA based at least in part on the feedback message indicating that the motion change is detected.

Aspect 10: The method of aspect 9, wherein receiving the set of inertial measurements associated with the wireless STA further comprises: receiving an indication of the set of inertial measurements associated with the wireless STA within a BA information field of the feedback message.

Aspect 11: The method of aspect 10, wherein receiving the feedback message indicating that the motion change is detected further comprises: receiving an indication that the BA information field includes the set of inertial measurements associated with the wireless STA via a bit within a BA control field of the feedback message.

Aspect 12: The method of aspect 9, wherein receiving the feedback message indicating that the motion change is detected further comprises: receiving an indication that the motion change is detected via a bit in the feedback message during a first time period.

Aspect 13: The method of aspect 12, wherein receiving the set of inertial measurements associated with the wireless STA further comprises: receiving, from the wireless STA, an uplink message including the set of inertial measurements associated with the wireless STA during a second time period based at least in part on receiving the indication that the motion change is detected via the bit in the feedback message during the first time period.

Aspect 14: The method of aspect 13, further comprising: refraining from transmitting downlink data between the first time period and the second time period based at least in part on receiving the indication that the motion change is detected during the first time period and receiving the uplink message including the set of inertial measurements associated with the wireless STA during the second time period.

Aspect 15: The method of any of aspects 9 through 14, wherein transmitting the first plurality of frames for the application of the wireless STA further comprises: transmitting a plurality of video frames for a VR application of the wireless STA.

Aspect 16: The method of any of aspects 9 through 15, wherein the AP operates in an MU-VR scenario, the method further comprising: transmitting, to a plurality of wireless STAs, a first plurality of video frames for VR applications of the plurality of wireless STAs; receiving, from one or more wireless STAs of the plurality of wireless STAs feedback messages responsive to the first plurality of video frames and indicating that respective motion changes of the one or more wireless STAs are detected and sets of inertial measurements associated with the one or more wireless STAs based at least in part on the indicating that the respective motion changes of the one or more wireless STAs are detected; and transmitting, to the one or more wireless STAs, a second plurality of video frames for the VR applications of the one or more wireless STAs based at least in part on the feedback messages indicating that the respective motion changes are detected.

Aspect 17: An apparatus for wireless communication at a wireless STA, comprising a processor; memory coupled with the processor; and instructions stored in the memory and executable by the processor to cause the apparatus to perform a method of any of aspects 1 through 8.

Aspect 18: An apparatus for wireless communication at a wireless STA, comprising at least one means for performing a method of any of aspects 1 through 8.

Aspect 19: A non-transitory computer-readable medium storing code for wireless communication at a wireless STA, the code comprising instructions executable by a processor to perform a method of any of aspects 1 through 8.

Aspect 20: An apparatus for wireless communication at an AP, comprising a processor; memory coupled with the processor; and instructions stored in the memory and executable by the processor to cause the apparatus to perform a method of any of aspects 9 through 16.

Aspect 21: An apparatus for wireless communication at an AP, comprising at least one means for performing a method of any of aspects 9 through 16.

Aspect 22: A non-transitory computer-readable medium storing code for wireless communication at an AP, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the WLAN 100 or the WLAN 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless station, comprising:
   receiving, from an access point, a first plurality of frames for an application of the wireless station;
   detecting a motion change of the wireless station;
   transmitting, to the access point:
      a feedback message including acknowledgement information associated with each of the first plurality of frames and indicating that the motion change is detected and
      a set of inertial measurements associated with the wireless station based at least in part on detecting the motion change of the wireless station; and
   receiving, from the access point, a second plurality of frames for the application of the wireless station based at least in part on the feedback message indicating that the motion change is detected and the set of inertial measurements associated with the wireless station.

2. The method of claim 1, wherein detecting the motion change of the wireless station further comprises:
   comparing a first set of inertial measurements from a first time period with the set of inertial measurements from a second time period to obtain a difference in inertial measurements between the first time period and the second time period; and
   determining that the difference in inertial measurements satisfies a motion change detection threshold.

3. The method of claim 1, wherein transmitting the set of inertial measurements associated with the wireless station further comprises:
   transmitting an indication of the set of inertial measurements associated with the wireless station within a block acknowledgement information field of the feedback message.

4. The method of claim 3, wherein transmitting the feedback message indicating that the motion change is detected further comprises:
   transmitting an indication that the block acknowledgement information field includes the set of inertial measurements associated with the wireless station via a bit within a block acknowledgement control field of the feedback message.

5. The method of claim 1, wherein transmitting the feedback message indicating that the motion change is detected further comprises:
   transmitting an indication that the motion change is detected via a bit in the feedback message during a first time period.

6. The method of claim 5, wherein transmitting the set of inertial measurements associated with the wireless station further comprises:
   transmitting an uplink message including the set of inertial measurements associated with the wireless station during a second time period based at least in part on transmitting the indication that the motion change is detected via the bit in the feedback message during the first time period.

7. The method of claim 6, wherein there is an absence of downlink data between the first time period and the second time period based at least in part on transmitting the indication that the motion change is detected during the first time period.

8. The method of claim 1, wherein receiving the first plurality of frames for the application of the wireless station further comprises:
   receiving a plurality of video frames for a virtual reality application of the wireless station.

9. A method for wireless communication at an access point, comprising:
   transmitting, to a wireless station, a first plurality of frames for an application of the wireless station;
   receiving, from the wireless station:
      a feedback message including acknowledgement information associated with each of the first plurality of frames and indicating that a motion change of the wireless station is detected and
      a set of inertial measurements associated with the wireless station based at least in part on the indicating that the motion change of the wireless station is detected; and
   transmitting, to the wireless station, a second plurality of frames for the application of the wireless station based at least in part on the feedback message indicating that the motion change is detected.

10. The method of claim 9, wherein receiving the set of inertial measurements associated with the wireless station further comprises:
   receiving an indication of the set of inertial measurements associated with the wireless station within a block acknowledgement information field of the feedback message.

11. The method of claim 10, wherein receiving the feedback message indicating that the motion change is detected further comprises:
   receiving an indication that the block acknowledgement information field includes the set of inertial measurements associated with the wireless station via a bit within a block acknowledgement control field of the feedback message.

12. The method of claim 9, wherein receiving the feedback message indicating that the motion change is detected further comprises:
   receiving an indication that the motion change is detected via a bit in the feedback message during a first time period.

13. The method of claim 12, wherein receiving the set of inertial measurements associated with the wireless station further comprises:
   receiving, from the wireless station, an uplink message including the set of inertial measurements associated with the wireless station during a second time period based at least in part on receiving the indication that the motion change is detected via the bit in the feedback message during the first time period.

14. The method of claim 13, further comprising:
   refraining from transmitting downlink data between the first time period and the second time period based at least in part on receiving the indication that the motion change is detected during the first time period and receiving the uplink message including the set of inertial measurements associated with the wireless station during the second time period.

15. The method of claim 9, wherein transmitting the first plurality of frames for the application of the wireless station further comprises:
   transmitting a plurality of video frames for a virtual reality application of the wireless station.

16. The method of claim 9, wherein the access point operates in a multi-user virtual reality scenario, the method further comprising:

transmitting, to a plurality of wireless stations, a first plurality of video frames for virtual reality applications of the plurality of wireless stations;
receiving, from one or more wireless stations of the plurality of wireless stations:
feedback messages responsive to the first plurality of video frames and indicating that respective motion changes of the one or more wireless stations are detected and
sets of inertial measurements associated with the one or more wireless stations based at least in part on the indicating that the respective motion changes of the one or more wireless stations are detected; and
transmitting, to the one or more wireless stations, a second plurality of video frames for the virtual reality applications of the one or more wireless stations based at least in part on the feedback messages indicating that the respective motion changes are detected.

17. An apparatus for wireless communication at a wireless station, comprising:
a processor;
memory coupled with the processor; and
instructions stored in the memory and executable by the processor to cause the apparatus to:
receive, from an access point, a first plurality of frames for an application of the wireless station;
detect a motion change of the wireless station;
transmit, to the access point:
a feedback message including acknowledgement information associated with each of the first plurality of frames and indicating that the motion change is detected and
a set of inertial measurements associated with the wireless station based at least in part on detecting the motion change of the wireless station; and
receive, from the access point, a second plurality of frames for the application of the wireless station based at least in part on the feedback message indicating that the motion change is detected and the set of inertial measurements associated with the wireless station.

18. The apparatus of claim 17, wherein the instructions to detect the motion change of the wireless station are further executable by the processor to cause the apparatus to:
compare a first set of inertial measurements from a first time period with the set of inertial measurements from a second time period to obtain a difference in inertial measurements between the first time period and the second time period; and
determine that the difference in inertial measurements satisfies a motion change detection threshold.

19. The apparatus of claim 17, wherein the instructions to transmit the set of inertial measurements associated with the wireless station are further executable by the processor to cause the apparatus to:
transmit an indication of the set of inertial measurements associated with the wireless station within a block acknowledgement information field of the feedback message.

20. The apparatus of claim 19, wherein the instructions to transmit the feedback message indicating that the motion change is detected are further executable by the processor to cause the apparatus to:
transmit an indication that the block acknowledgement information field includes the set of inertial measurements associated with the wireless station via a bit within a block acknowledgement control field of the feedback message.

21. The apparatus of claim 17, wherein the instructions to transmit the feedback message indicating that the motion change is detected are further executable by the processor to cause the apparatus to:
transmit an indication that the motion change is detected via a bit in the feedback message during a first time period.

22. The apparatus of claim 21, wherein the instructions to transmit the set of inertial measurements associated with the wireless station are further executable by the processor to cause the apparatus to:
transmit an uplink message including the set of inertial measurements associated with the wireless station during a second time period based at least in part on transmitting the indication that the motion change is detected via the bit in the feedback message during the first time period.

23. The apparatus of claim 22, wherein there is an absence of downlink data between the first time period and the second time period based at least in part on transmitting the indication that the motion change is detected during the first time period.

24. An apparatus for wireless communication at an access point, comprising:
a processor;
memory coupled with the processor; and
instructions stored in the memory and executable by the processor to cause the apparatus to:
transmit, to a wireless station, a first plurality of frames for an application of the wireless station;
receive, from the wireless station:
a feedback message including acknowledgement information associated with each of the first plurality of frames and indicating that a motion change of the wireless station is detected and
a set of inertial measurements associated with the wireless station based at least in part on the indicating that the motion change of the wireless station is detected; and
transmit, to the wireless station, a second plurality of frames for the application of the wireless station based at least in part on the feedback message indicating that the motion change is detected.

25. The apparatus of claim 24, wherein the instructions to receive the set of inertial measurements associated with the wireless station are further executable by the processor to cause the apparatus to:
receive an indication of the set of inertial measurements associated with the wireless station within a block acknowledgement information field of the feedback message.

26. The apparatus of claim 25, wherein the instructions to receive the feedback message indicating that the motion change is detected are further executable by the processor to cause the apparatus to:
receive an indication that the block acknowledgement information field includes the set of inertial measurements associated with the wireless station via a bit within a block acknowledgement control field of the feedback message.

27. The apparatus of claim 24, wherein the instructions to receive the feedback message indicating that the motion change is detected are further executable by the processor to cause the apparatus to:

receive an indication that the motion change is detected via a bit in the feedback message during a first time period.

28. The apparatus of claim 27, wherein the instructions to receive the set of inertial measurements associated with the wireless station are further executable by the processor to cause the apparatus to:
  receive, from the wireless station, an uplink message including the set of inertial measurements associated with the wireless station during a second time period based at least in part on receiving the indication that the motion change is detected via the bit in the feedback message during the first time period.

29. The apparatus of claim 28, wherein the instructions are further executable by the processor to cause the apparatus to:
  refrain from transmitting downlink data between the first time period and the second time period based at least in part on receiving the indication that the motion change is detected during the first time period and receiving the uplink message including the set of inertial measurements associated with the wireless station during the second time period.

30. The apparatus of claim 24, wherein the access point operates in a multi-user virtual reality scenario, and the instructions are further executable by the processor to cause the apparatus to:
  transmit, to a plurality of wireless stations, a first plurality of video frames for virtual reality applications of the plurality of wireless stations;
  receive, from one or more wireless stations of the plurality of wireless stations:
    feedback messages responsive to the first plurality of video frames and indicating that respective motion changes of the one or more wireless stations are detected and
    sets of inertial measurements associated with the one or more wireless stations based at least in part on the indicating that the respective motion changes of the one or more wireless stations are detected; and
  transmit, to the one or more wireless stations, a second plurality of video frames for the virtual reality applications of the one or more wireless stations based at least in part on the feedback messages indicating that the respective motion changes are detected.

* * * * *